(12) United States Patent
Zhao et al.

(10) Patent No.: US 8,780,965 B2
(45) Date of Patent: Jul. 15, 2014

(54) COORDINATING DATA CALLS ON A MOBILE DEVICE WITH MULTIPLE MODEMS

(75) Inventors: Suli Zhao, San Diego, CA (US); Ajith T. Payyappilly, San Diego, CA (US); Vaibhav Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 13/172,147

(22) Filed: Jun. 29, 2011

(65) Prior Publication Data

US 2012/0027059 A1 Feb. 2, 2012

Related U.S. Application Data

(60) Provisional application No. 61/369,578, filed on Jul. 30, 2010.

(51) Int. Cl.
*H04B 1/38* (2006.01)
*H04W 4/00* (2009.01)

(52) U.S. Cl.
USPC ........................................ 375/222; 455/435.2

(58) Field of Classification Search
CPC . H04W 36/0016; H04W 36/14; H04W 48/18; H04W 52/0229; H04W 68/00; H04W 76/027; H04W 76/04; H04W 76/068; H04W 88/06
USPC ...................... 375/222; 455/434, 435.1–435.3
See application file for complete search history.

(56) References Cited

U.S. PATENT DOCUMENTS

| 4,837,800 A * | 6/1989 | Freeburg et al. ............... 455/557 |
| 6,119,003 A | 9/2000 | Kukkohovi |
| 7,016,697 B2 | 3/2006 | Ngai et al. |
| 7,260,072 B2 | 8/2007 | Lee et al. |
| 8,660,527 B2 | 2/2014 | Nookala et al. |

(Continued)

FOREIGN PATENT DOCUMENTS

| EP | 1392071 A1 | 2/2004 |
| EP | 1619914 A1 | 1/2006 |

(Continued)

OTHER PUBLICATIONS

Partial International Search Report—PCT/US2011/042538—ISA/EPO—Nov. 4, 2011.

(Continued)

*Primary Examiner* — David B Lugo
(74) *Attorney, Agent, or Firm* — Arent Fox LLP

(57) ABSTRACT

A method for inter-modem coordination is described. A first data connection to a network in a first network coverage area using a first air interface provided by a first modem is established. The method also includes detecting a second network coverage area with a second air interface provided by a second modem. A data call state of the second modem is determined by the first modem. The first data connection to the network by the first modem is terminated when the data call state of the second modem is no data call. A data call state of the first modem is determined by the second modem. A second data connection to the network using the second air interface provided by the second modem is initiated when the data call state of the first modem is no data call.

12 Claims, 18 Drawing Sheets

(56) References Cited

U.S. PATENT DOCUMENTS

| | | |
|---|---|---|
| 2002/0102978 A1 | 8/2002 | Yahagi |
| 2004/0253946 A1 | 12/2004 | Gibbs |
| 2005/0282579 A1* | 12/2005 | Kim ........................... 455/552.1 |
| 2006/0189346 A1 | 8/2006 | Turner et al. |
| 2007/0047562 A1 | 3/2007 | Sayeedi et al. |
| 2007/0137617 A1 | 6/2007 | Schueler et al. |
| 2007/0177617 A1 | 8/2007 | Noh et al. |
| 2007/0286176 A1 | 12/2007 | Flint |
| 2008/0146268 A1 | 6/2008 | Gandhi et al. |
| 2010/0034124 A1 | 2/2010 | Payyappilly et al. |
| 2010/0056200 A1 | 3/2010 | Tolonen |
| 2011/0086638 A1* | 4/2011 | Medapalli ..................... 455/436 |
| 2011/0267939 A1* | 11/2011 | Streed et al. .................. 370/216 |

FOREIGN PATENT DOCUMENTS

| | | |
|---|---|---|
| JP | 2000-261857 | 9/2000 |
| JP | 2001-224071 A | 8/2001 |
| JP | 2002-232573 A | 8/2002 |
| JP | 2003-092782 A | 3/2003 |
| WO | WO-2006/089198 A1 | 8/2006 |

OTHER PUBLICATIONS

International Search Report and Written Opinion—PCT/US2011/042538—ISA/EPO—Jan. 11, 2012.

Written Opinion of the International Preliminary Examining Authority—PCT/US2011/042538—ISA/EPO—Sep. 24, 2012.

U.S. Appl. No. 12/971,446, filed Dec. 17, 2010, Zhao et al.

Wise, Jeff; Bennett, YuMei, "Method and Apparatus for Voice Call Handoff from CS to PS Domains using a Single Transceiver," IPCOM000170579D, May 2008.

* cited by examiner

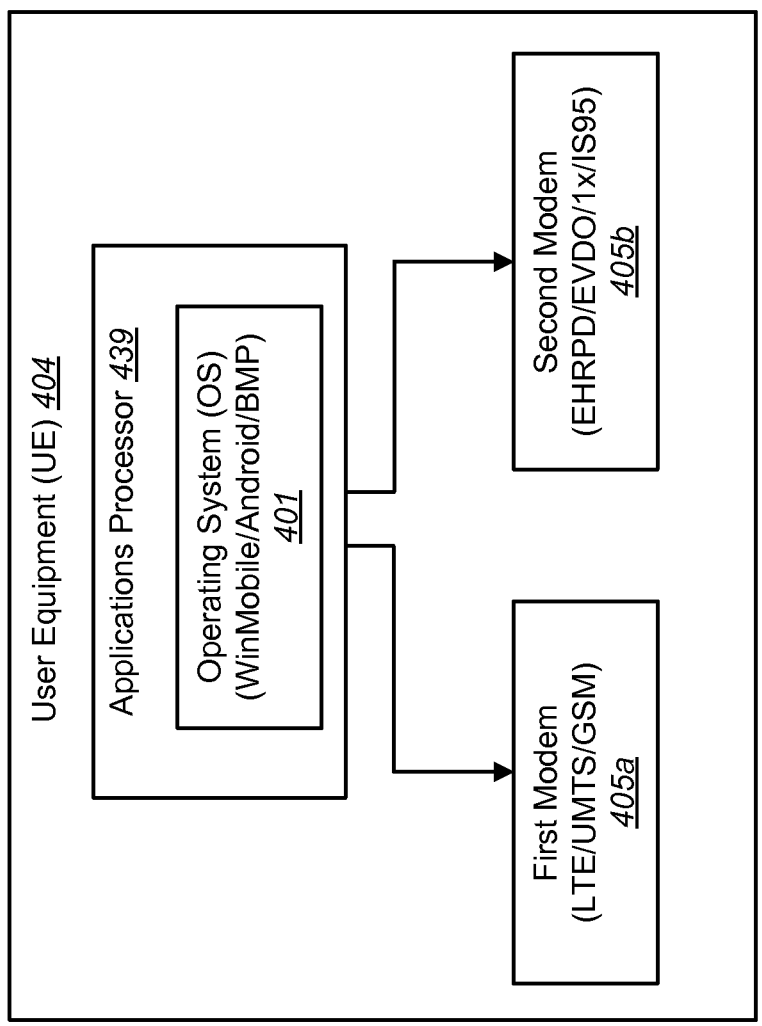

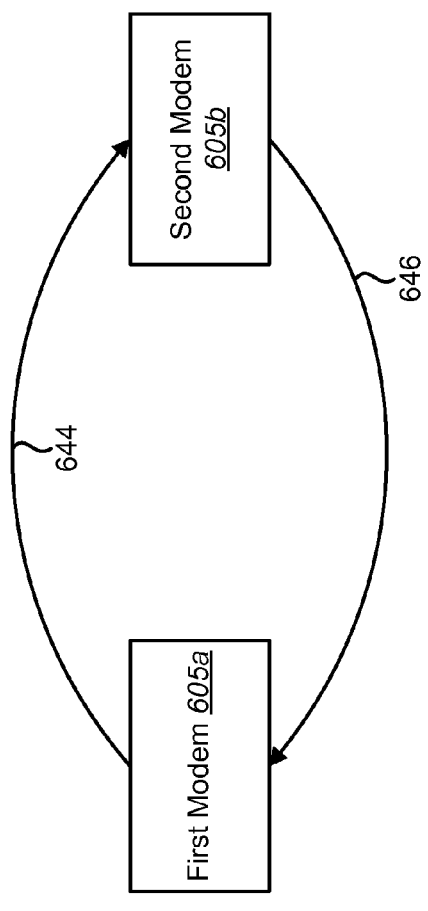
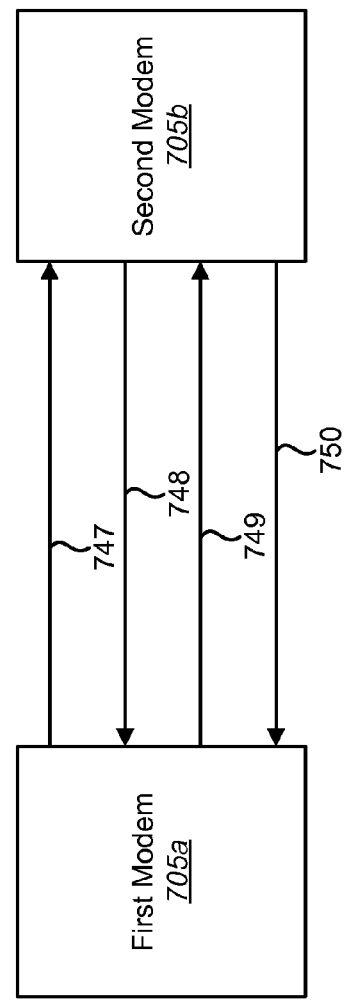

COORDINATING DATA CALLS ON A MOBILE DEVICE WITH MULTIPLE MODEMS

RELATED APPLICATIONS

This application is related to and claims priority from U.S. Provisional Patent Application Ser. No. 61/369,578, filed Jul. 30, 2010, for "METHOD AND APPARATUS FOR COORDINATING DATA CALLS ON A MOBILE DEVICE WITH MULTIPLE MODEMS."

TECHNICAL FIELD

The present disclosure relates generally to wireless communication systems. More specifically, the present disclosure relates to systems and methods for coordinating data calls on a mobile device with multiple modems.

BACKGROUND

Wireless communication systems are widely deployed to provide various types of communication content such as voice, video, data and so on. These systems may be multiple-access systems capable of supporting simultaneous communication of multiple mobile devices with one or more base stations.

A typical mobile device may employ one modem to handle the air interface technologies supported by the mobile device. However, as the number of air interface technologies available has increased, so has the possibility that a mobile device will support more than one air interface technology. A mobile device may employ two modems to handle the multiple air interfaces. Benefits may be realized by improvements to mobile devices with two modems.

SUMMARY

A method for inter-modem coordination is described. A first data connection to a network in a first network coverage area using a first air interface provided by a first modem is established. A second network coverage area with a second air interface provided by a second modem is detected. A data call state of the second modem is determined The first data connection to the network is terminated by the first modem when the data call state of the second modem is no data call. A data call state of the first modem is determined by the second modem. A second data connection to the network using the second air interface provided by the second modem is initiated when the data call state of the first modem is no data call.

A timer may be started by the first modem. The data call state of the first modem may be changed to no data call when the timer expires. A timer may be started by the second modem. The second data connection to the network may be initiated when the timer expires. The data call state may be no data call, establishing a data call, data call established or data call being torn down.

Determining a data call state of the second modem by the first modem may include receiving an inter-modem communication from the second modem to signal the data call state of the second modem to the first modem. Determining a data call state of the first modem by the second modem may include receiving an inter-modem communication from the first modem to signal the data call state of the first modem to the second modem. The second data connection to the network may provide better data service than the first data connection. The method may be performed by a user equipment that includes the first modem and the second modem.

A method for inter-modem coordination is also described. A data connection between a tethered terminal and a network on a first air interface using a first modem is established. Notification of a message from the network is received on a second air interface using a second modem. A data call state of the first modem is determined by the second modem. The message is received over the second air interface for the tethered terminal using the second modem when the data call state of the first modem is one of bringing up data call, data call established and data call being torn down.

A call type of the first modem may be determined by the second modem when the data call state of the first modem is not no data call. The message over the second air interface may be rejected when the call type is tethered. The message may be received over the second air interface using the second modem when the call type is embedded. Receiving the message over the second air interface using the second modem may include establishing a tethered circuit switched data call with a tethered device on an Rm link.

The data call state may be one of no data call, establishing a data call, data call established and data call being torn down. The message may be a paging message. The method may be performed by a user equipment that includes the first modem and the second modem.

A method for inter-modem coordination during call throttling is described. A request from an application to establish a data call on a first air interface using a first modem is received. A call throttled state of a second modem is determined by the first modem. The data call is established over the first air interface using the first modem when the second modem is not throttled.

The second modem may be throttled. It may be determined whether the call throttled state of the second modem is due to radio failure. The data call may be established over the first air interface using the first modem when the call throttled state of the second modem is due to radio failure. It may be determined that the call throttled state of the second modem is not due to radio failure. The call throttled state, attempts counter and throttling timer of the second modem may be utilized on the first modem. The request to establish the data call may be rejected. The method may be performed by a user equipment that includes the first modem and the second modem.

A wireless device configured for inter-modem coordination is also described. The wireless device includes a processor, memory in electronic communication with the processor and instructions stored in the memory. The instructions are executable by the processor to establish a first data connection to a network in a first network coverage area using a first air interface provided by a first modem. The instructions are also executable to detect a second network coverage area with a second air interface provided by a second modem. The instructions are further executable to determine a data call state of the second modem by the first modem. The instructions are also executable to terminate the first data connection to the network by the first modem when the data call state of the second modem is no data call. The instructions are further executable to determine a data call state of the first modem by the second modem. The instructions are also executable to initiate a second data connection to the network using the second air interface provided by the second modem when the data call state of the first modem is no data call.

A wireless device configured for inter-modem coordination is described. The wireless device includes a processor, memory in electronic communication with the processor and instructions stored in the memory. The instructions are executable by the processor to establish a data connection between a tethered terminal and a network on a first air interface using a first modem. The instructions are also executable by the processor to receive notification of a message from the network on a second air interface using a second modem. The instructions are further executable by the processor to determine a data call state of the first modem by the second modem. The instructions are also executable by the processor to receive the message over the second air interface for the tethered terminal using the second modem when the data call state of the first modem is no data call.

A wireless device configured for inter-modem coordination during call throttling is described. The wireless device includes a processor, memory in electronic communication with the processor and instructions stored in the memory. The instructions are executable by the processor to receive a request from an application to establish a data call on a first air interface using a first modem. The instructions are also executable by the processor to determine a call throttled state of a second modem by the first modem. The instructions are further executable by the processor to establish the data call over the first air interface using the first modem when the call throttled state of the second modem is not throttled.

A wireless device configured for inter-modem coordination is also described. The wireless device includes means for establishing a first data connection to a network in a first network coverage area using a first air interface provided by a first modem. The wireless device also includes means for detecting a second network coverage area with a second air interface provided by a second modem. The wireless device further includes means for determining a data call state of the second modem by the first modem. The wireless device also includes means for terminating the first data connection to the network by the first modem when the data call state of the second modem is no data call. The wireless device further includes means for determining a data call state of the first modem by the second modem. The wireless device also includes means for initiating a second data connection to the network using the second air interface provided by the second modem when the data call state of the first modem is no data call.

A computer-program product for inter-modem coordination is described. The computer-program product includes a non-transitory computer-readable medium having instructions thereon. The instructions include code for causing a wireless device to establish a first data connection to a network in a first network coverage area using a first air interface provided by a first modem. The instructions also include code for causing the wireless device to detect a second network coverage area with a second air interface provided by a second modem. The instructions further include code for causing the wireless device to determine a data call state of the second modem by the first modem. The instructions also include code for causing the wireless device to terminate the first data connection to the network by the first modem when the data call state of the second modem is no data call. The instructions further include code for causing the wireless device to determine a data call state of the first modem by the second modem. The instructions also include code for causing the wireless device to initiate a second data connection to the network using the second air interface provided by the second modem when the data call state of the first modem is no data call.

A wireless device configured for inter-modem coordination is also described. The wireless device includes means for establishing a data connection between a tethered terminal and a network on a first air interface using a first modem. The wireless device also includes means for receiving notification of a message from the network on a second air interface using a second modem. The wireless device further includes means for determining a data call state of the first modem by the second modem. The wireless device also includes means for receiving the message over the second air interface for the tethered terminal using the second modem when the data call state of the first modem is no data call.

A computer-program product for inter-modem coordination is described. The computer-program product includes a non-transitory computer-readable medium having instructions thereon. The instructions include code for causing a wireless device to establish a data connection between a tethered terminal and a network on a first air interface using a first modem. The instructions also include code for causing the wireless device to receive notification of a message from the network on a second air interface using a second modem. The instructions further include code for causing the wireless device to determine a data call state of the first modem by the second modem. The instructions also include code for causing the wireless device to receive the message over the second air interface using the second modem when the data call state of the first modem is no data call.

A wireless device configured for inter-modem coordination during call throttling is also described. The wireless device includes means for receiving a request from an application to establish a data call on a first air interface using a first modem. The wireless device also includes means for determining a call throttled state of a second modem by the first modem. The wireless device further includes means for establishing the data call over the first air interface using the first modem when the call throttled state of the second modem is not throttled.

A computer-program product for inter-modem coordination during call throttling is described. The computer-program product includes a non-transitory computer-readable medium having instructions thereon. The instructions include code for causing a wireless device to receive a request from an application to establish a data call on a first air interface using a first modem. The instructions also include code for causing the wireless device to determine a call throttled state of a second modem by the first modem. The instructions further include code for causing the wireless device to establish the data call over the first air interface using the first modem when the call throttled state of the second modem is not throttled.

BRIEF DESCRIPTION OF THE DRAWINGS

FIG. 4 is a block diagram illustrating another user equipment (UE) with multiple modems;

FIG. 6 is a block diagram illustrating event-based inter-modem communications between a first modem and a second modem;

FIG. 7 is a block diagram illustrating query and response inter-modem communications between a first modem and a second modem;

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP Long Term Evolution (LTE), a mobile station or device may be referred to as a "user equipment" (UE).

Figure 1:
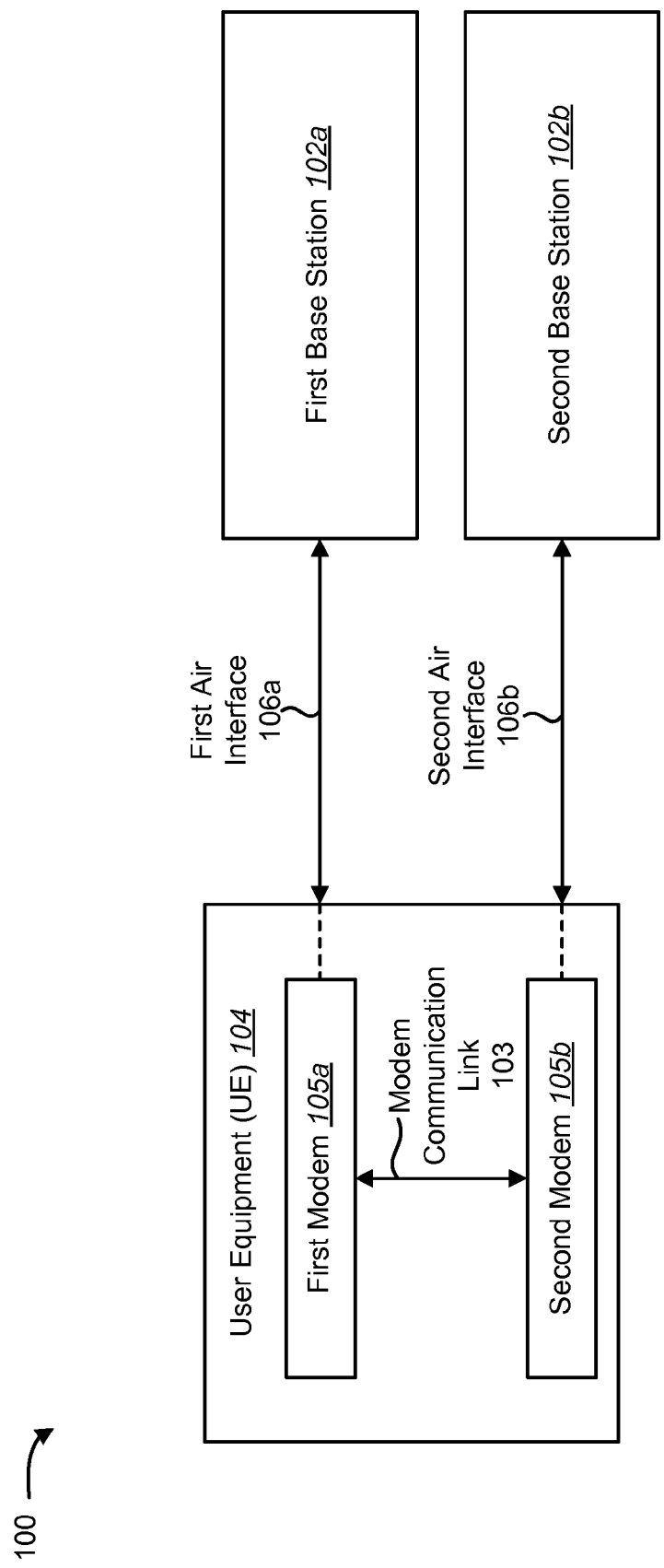
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station 102 or a user equipment (UE) 104.

A base station 102 is a station that communicates with one or more user equipments (UEs) 104. A base station 102 may also be referred to as, and may include some or all of the functionality of, an access point, a broadcast transmitter, a NodeB, an evolved NodeB, etc. The term "base station" will be used herein. Each base station 102 provides communication coverage for a particular geographic area. A base station 102 may provide communication coverage for one or more user equipments (UEs) 104. The term "cell" can refer to a base station 102 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple user equipments (UEs) 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2). For clarity, certain aspects of the techniques are described below for Long Term Evolution (LTE), and Long Term Evolution (LTE) terminology is used in much of the description below.

A user equipment (UE) 104 may also be referred to as, and may include some or all of the functionality of, a terminal, an access terminal, a wireless communication device, a subscriber unit, a station, etc. A user equipment (UE) 104 may be a cellular phone, a personal digital assistant (PDA), a wireless device, a wireless modem, a handheld device, a laptop computer, etc.

A user equipment (UE) 104 may communicate with zero, one or multiple base stations 102a-b on the downlink and/or uplink at any given moment. The downlink (or forward link) refers to the communication link from a base station 102 to a user equipment (UE) 104, and the uplink (or reverse link) refers to the communication link from a user equipment (UE) 104 to a base station 102. The user equipment (UE) 104 in FIG. 1 is a general user equipment (UE) 104 and as such, all references to user equipment (UE) herein may generally refer to the user equipment (UE) 104 of FIG. 1 and also more specifically refer to the other uses of user equipment (UE) throughout.

A user equipment (UE) 104 may be capable of communicating with a first base station 102a via a first air interface 106a and a second base station 102b via a second air interface 106b. A user equipment (UE) 104 may use one or multiple antennas (not shown) for each air interface 106. In one configuration, a user equipment (UE) 104 may use a single antenna for both the first air interface 106a and the second air interface 106b. A user equipment (UE) 104 may use a first modem 105a for communicating with the first base station 102a via the first air interface 106a and a second modem 105b for communicating with the second base station 102b via the second air interface 106b. Examples of air interfaces 106 include an IS95 airlink, a 1× airlink, an Evolution-Data Optimized (EVDO) airlink, an evolved high rate packet data (EHRPD) airlink and a Long Term Evolution (LTE) airlink. An airlink is a type of air interface 106. The first modem 105a and the second modem 105b may communicate with each other using a modem communication link 103.

Figure 2:
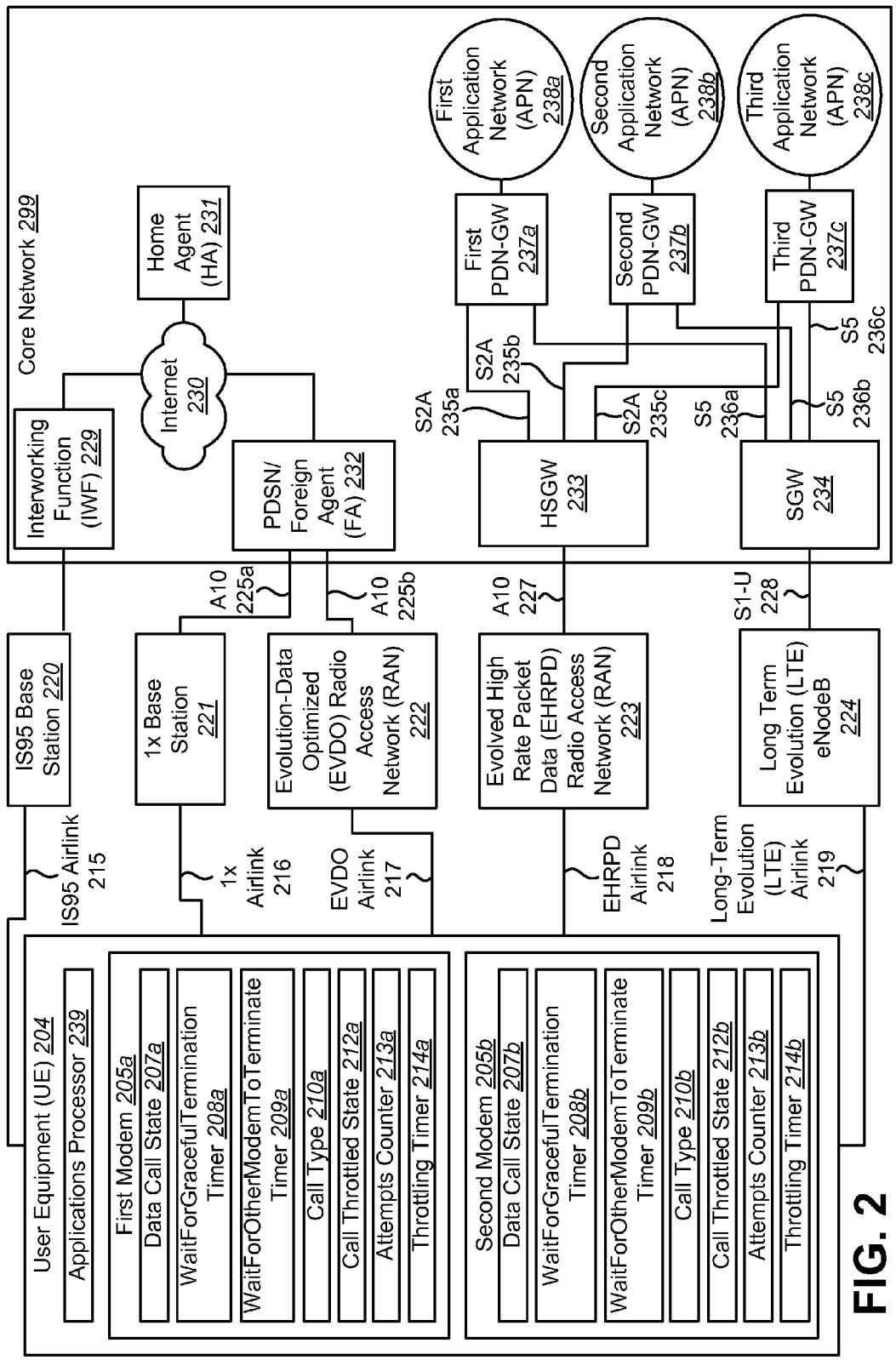
FIG. 2 is a block diagram illustrating various types of connectivity between a user equipment (UE) and a core network that the user equipment (UE) may utilize for data services and/or voice services.

FIG. 2 is a block diagram illustrating various types of connectivity between a user equipment (UE) 204 and a core network 299 that the user equipment (UE) 204 may utilize for data services and/or voice services. Multiple air interfaces (or airlinks) may provide a data connection for a user equipment (UE) 204 to the Internet 230 via an Interim Standard 95 (IS95) base station 220, a CDMA 2000 1× (referred to herein as "1×", may also be referred to as IS-2000 or 1×RTT) base station 221 and/or an Evolution-Data Optimized (EVDO) radio access network (RAN) 222. The IS95 base station 220 may provide an IS95 airlink 215 for the user equipment (UE) 204. The IS95 base station 220 may be connected to the Internet 230 via an InterWorking Function (IWF) 229. The 1× base station 221 may provide a 1× airlink 216 to the user equipment (UE) 204. The Evolution-Data Optimized (EVDO) radio access network (RAN) 222 may provide an Evolution-Data Optimized (EVDO) airlink 217 to the user equipment (UE) 204. The 1× base station 221 and Evolution-Data Optimized (EVDO) radio access network (RAN) 222 may be connected via A10 interfaces 225a-b to a Packet Data Serving Node (PDSN) 232, which in turn is connected to the Internet 230. The Packet Data Serving Node (PDSN) 232 may include a Foreign Agent (FA). A Home Agent (HA) 231 may be connected to the Internet 230.

The network architecture may include data connectivity via the evolved high rate packet data (EHRPD) airlink 218 and an evolved high rate packet data (EHRPD) radio access network (RAN) 223 to the core network 299. The evolved high rate packet data (EHRPD) radio access network (RAN) 223 may employ an A10 interface 227 to connect to an HRPD Serving Gateway (HSGW) 233. The network architecture may also include data connectivity via the Long Term Evolution (LTE) airlink 219 and Long Tenn Evolution (LTE) eNodeB 224. The Long Tenn Evolution (LTE) eNodeB 224 may employ an S1-U interface 228 to connect to a Serving Gateway (SGW) 234. The HRPD Serving Gateway (HSGW) 233 may connect to a first Packet Data Network Gateway (PDN-GW) 237a, a second Packet Data Network Gateway (PDN-GW) 237b and a third Packet Data Network Gateway (PDN-GW) 237c via S2A interfaces 235a-c. The Serving Gateway (SGW) 234 may connect with the first Packet Data Network Gateway (PDN-GW) 237a, the second Packet Data Network Gateway (PDN-GW) 237b and the third Packet Data Network Gateway (PDN-GW) 237c via S5 interfaces 236a-c. The first Packet Data Network Gateway (PDN-GW) 237a may connect to a first Application Network (APN) 238a. The second Packet Data Network Gateway (PDN-GW) 237b may connect to a second Application Network (APN) 238b. The third Packet Data Network Gateway (PDN-GW) 237c may connect to a third Application Network (APN) 238c. An Application Network (APN) 238 may include, but is not limited to, an Internet Multimedia System (IMS) that a user equipment (UE) 204 connects to for obtaining Voice over IP (VoIP) or video telephony services or an Administrative Application Network (APN) the user equipment (UE) 204 may establish a connection with in order to download configuration information for the user equipment (UE) 204.

The user equipment (UE) 204 may move through the network. As the user equipment (UE) 204 moves through the network, the user equipment (UE) 204 may move from an area with coverage provided by one air interface technology to an area with coverage provided by another air interface technology or into a coverage area with overlapping air interface technologies. The two air interface technologies may be provided by separate modems 205 on the user equipment (UE) 204. Further, a common core network 299 may support the air interface technologies. In one configuration, a first modem 205a may support a 1× air interface 106 and a second modem 205b may support an Evolution-Data Optimized (EVDO) air interface 106. Both air interface technologies may share a common core network 299. In another configuration, a first modem 205a may support an evolved high rate packet data (EHRPD) air interface technology while a second modem 205b provides support for a Long Term Evolution (LTE) air interface technology. The evolved high rate packet data (EHRPD) and Long Tenn Evolution (LTE) air interface 106 technologies may be supported by the same core network 299.

When a user equipment (UE) 204 utilizes multiple modems 205 where each modem 205 may support an air interface 106 technology supported by the same core network 299, problems may arise as the user equipment (UE) 204 moves through the core network 299, setting up and tearing down data connections on the different air interfaces 106. The problems that may arise will be illustrated with a user equipment (UE) 204 that includes a first modem 205a supporting LTE/UMTS/GSM/EVDO/EHRPD air interface technologies and a second modem 205b supporting 1×/IS95 air interface technologies. This is done for the sake of illustration and not by way of limitation. Similar problems may exist for other combinations of air interface technologies incorporated into the two modems 205, where at least one air interface technology of each modem 205 shares a common core network 299.

An applications processor 239 on the user equipment (UE) 204 may determine which modem 205 should be employed when each modem 205 in the user equipment (UE) 204 provides data connectivity to a common core network 299. For example, the applications processor 239 typically may select Evolution-Data Optimized (EVDO) over 1× when both Evolution-Data Optimized (EVDO) and 1× connectivity is available.

Each modem 205 may inform the operating system (OS) on the applications processor 239 whether that particular modem 205 provides data connectivity, depending on the coverage area the user equipment (UE) 204 is in and the received signal strength over the air interface 106. When both modems 205 indicate that they are each capable of providing data service, the operating system (OS) on the applications processor 239 may choose the modem 205 that offers the more advanced technology. For example, in a 1×-only coverage area, the second modem 205b (the 1× air interface modem) will report that it is capable of providing connectivity on 1×. The first modem 205a will not report that it is capable of connectivity on 1×. When an application wants data connectivity, the operating system (OS) may only initiate data connectivity using the second modem 205b over the 1× air interface 106. In another area where there is both evolved high rate packet data (EHRPD) and 1× connectivity, the first modem 205a and the second modem 205b will each report connectivity over evolved high rate packet data (EHRPD) and 1×, respectively. When an application wants data connectivity, the operating system (OS) on the applications processor 239 may initiate the data connection on the first modem 205a because evolved high rate packet data (EHRPD) may be the more advanced technology or may be more preferred over 1×.

In yet another example, when the user equipment (UE) 204 is in an area where there is Long Term Evolution (LTE), evolved high rate packet data (EHRPD) and 1× connectivity, the first modem 205a may report that it is capable of providing connectivity over Long Tenn Evolution (LTE), while the second modem 205b may report that it is capable of providing connectivity over 1×. It is to be appreciated that the first modem 205a may internally decide that Long Tenn Evolution (LTE) is a preferred (e.g., better technology) over evolved high rate packet data (EHRPD). The operating system (OS) on the applications processor 239 may decide to establish connectivity over Long Term Evolution (LTE) rather than over 1×.

Each modem 205a-b may include a data call state 207a-b, respectively. Examples of data call states 207 include "no data call," "bringing up a data call over Technology X," "data call established over Technology X" and "data call being torn down over Technology X." X may refer to the active technology in the modem 205. Each modem 205a-b may also include a WaitForGracefulTermination timer 208a-b, respectively. Each modem 205a-b may further include a WaitForOtherModemToTerminate timer 209a-b, respectively. The WaitForGracefulTermination timer 208 may be used by a modem 205 that has an established data call to ensure that the modem 205 does not wait indefinitely for the established data call to be torn down. The WaitForOtherModemToTerminate timer 209 may be used by a modem 205 that is waiting to establish a data call to ensure that the modem 205 does not wait indefinitely for the modem 205 with an established data call to change its state to "no data call." The WaitForOtherModemToTerminate timer 209 and the WaitForGracefulTermination timer 208 are discussed in additional detail below in relation to FIG. 10.

Each modem 205a-b may also include a call type 210a-b, respectively. A call type 210 may be either "embedded call" or "tethered call." In an embedded call, the data call is initiated by the user equipment (UE) 204. In a tethered call, the data call is initiated by a tethered device (such as a laptop). Embedded calls and tethered called are discussed in additional detail below in relation to FIG. 14.

Each modem 205a-b may further include a call throttled state 212a-b, respectively. A call throttled state 212 may indicate whether a data call is throttled or non-throttled. When the call throttled state 212 is throttled, the call throttled state 212 may indicate whether the throttling is due to radio or non-radio failures. The data throttled state 212 may also indicate the number of data call attempts made. The modem 205a-b may each respectively use an attempts counter 213a-b to keep track of the number of data call attempts made and a throttling timer 214a-b to keep track of how long a data call should be throttled. The call throttled state 212 is discussed in additional detail below in relation to FIG. 16 and FIG. 17.

Figure 3:
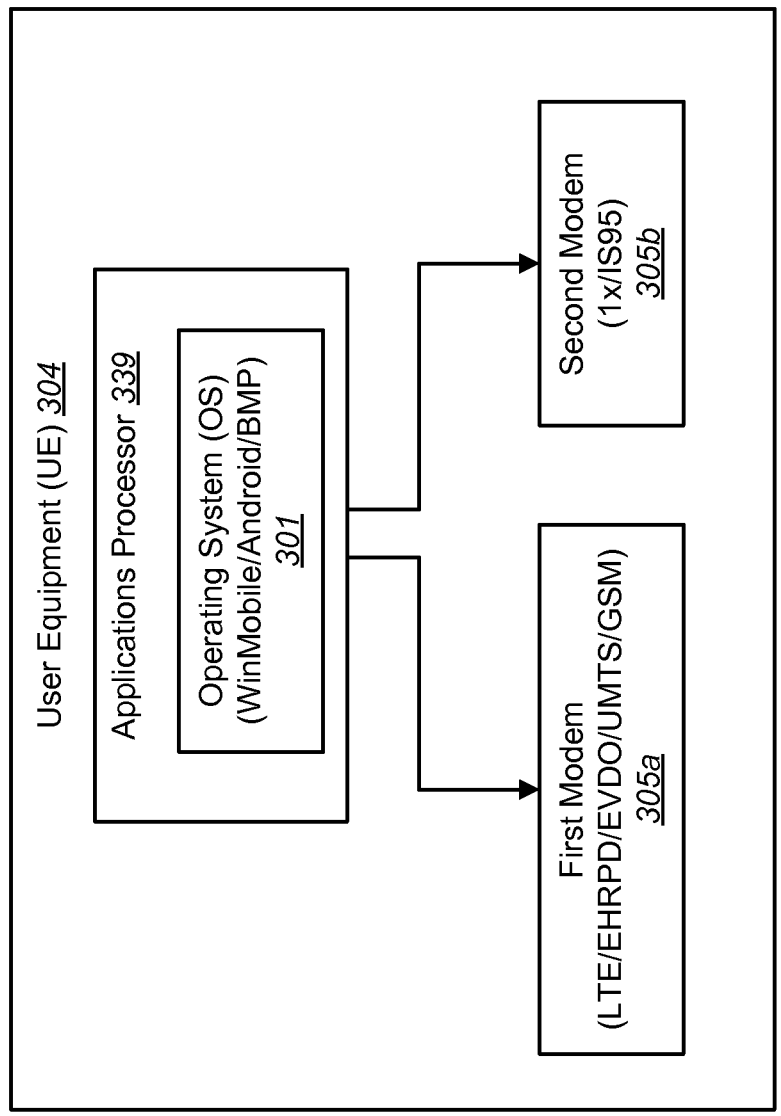
FIG. 3 is a block diagram illustrating a user equipment (UE) with multiple modems.

FIG. 3 is a block diagram illustrating a user equipment (UE) 304 with multiple modems 305a-b. The user equipment (UE) 304 may include an applications processor 339, a first modem 305a and a second modem 305b. The applications processor 339 may run an operating system (OS) 301 such as Windows Mobile, Android, Linux Mobile Operating System (LIMO), Brew Mobile Platform (BMP), etc. The first modem 305a may support air interface technologies such as LTE/EHRPD/EVDO/UMTS/GSM. In one configuration, the first modem 305a may support only 3GPP air interface technologies. The second modem 305b may support air interface technologies such as 1×/IS95. In one configuration, the second modem 305b may only support 3GPP2 air interface technologies.

FIG. 4 is a block diagram illustrating another user equipment (UE) 404 with multiple modems 405a-b. The user equipment (UE) 404 may include an applications processor 439, a first modem 405a and a second modem 405b. The applications processor 439 may run an operating system (OS) 401 such as Windows Mobile, Android, LIMO, etc. The first modem 405a may support air interface technologies such as LTE/UMTS/GSM. The second modem 405b may support air interface technologies such as EHRPD/EVDO/1×/IS95.

FIGS. 5A-5F depict various scenarios in which a user equipment (UE) 504 may experience a change in coverage area (or a change in connectivity to the network). FIGS. 5A-5F depict the same three coverage areas: 1× 540, 1×+EVDO 541 and EVDO 542. A first modem 105a on the user equipment (UE) 504 may support LTE/UMTS/GSM/EVDO/EHRPD air interfaces and a second modem 105b on the user equipment (UE) 504 may support 1×/IS95 air interfaces. Similar problems and solutions may be extended to modem configurations with other combinations of air interface technologies.

Figure 5A:
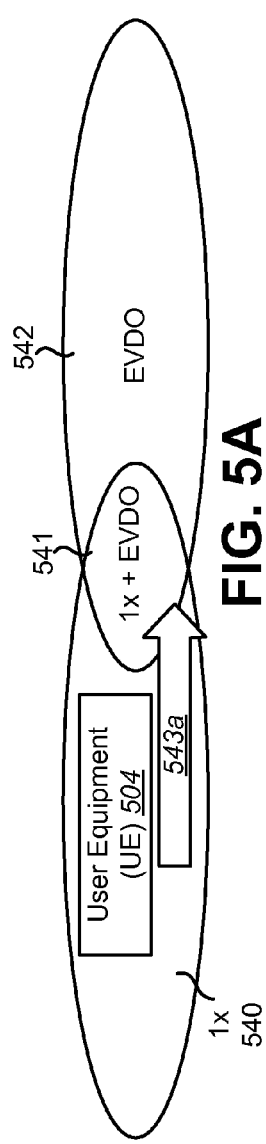
FIG. 5A depicts a scenario when a user equipment (UE) moves from a 1×-only coverage area to an Evolution-Data Optimized (EVDO) and 1× coverage area.

FIG. 5A depicts a scenario when a user equipment (UE) 504 moves from a 1×-only coverage area 540 to an Evolution-Data Optimized (EVDO) and 1× coverage area 541. While the user equipment (UE) 504 is in the 1×-only coverage area 540, data connectivity may be established by the operating system (OS) of the applications processor 339 through the second modem 105b over 1×. When the user equipment (UE) 504 moves into the Evolution-Data Optimized (EVDO) and 1× coverage area 541, the first modem 105a may report to the operating system (OS) on the applications processor 339 that it is capable of providing data connectivity over Evolution-Data Optimized (EVDO). This may be referred to as the first scenario 543a.

Figure 5B:
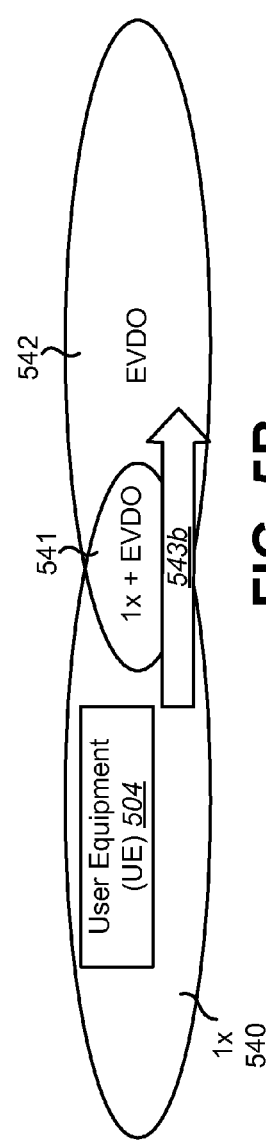
FIG. 5B depicts a scenario where the user equipment (UE) moves from a 1×-only coverage area to an Evolution-Data Optimized (EVDO) coverage area.

FIG. 5B depicts a scenario where the user equipment (UE) 504 moves from a 1×-only coverage area 540 to an Evolution-Data Optimized (EVDO) coverage area 542. The data connectivity over 1× may initially be established using the second modem 105b by the operating system (OS) on the applications processor 339. Then, the user equipment (UE) 504 may move to an Evolution-Data Optimized (EVDO) coverage area 542, where there is Evolution-Data Optimized (EVDO) air interface coverage only (i.e., no evolved high rate packet data (EHRPD), no Long Term Evolution (LTE) and no 1×). In the Evolution-Data Optimized (EVDO) coverage area 542, the first modem 105*a* may report data connectivity over Evolution-Data Optimized (EVDO) to the operating system (OS) and the second modem 105*b* may report a loss of data connectivity over 1×. This may be referred to as the second scenario 543*b*.

Figure 5C:
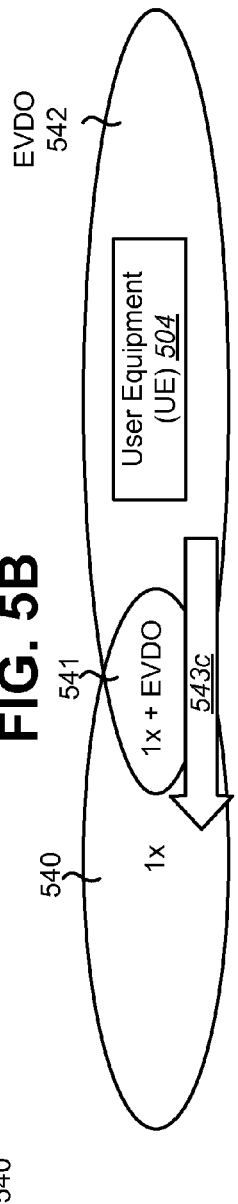
FIG. 5C depicts a scenario where the user equipment (UE) moves from an Evolution-Data Optimized (EVDO) only coverage area to a 1×-only coverage area.

FIG. 5C depicts a scenario where the user equipment (UE) 504 moves from an Evolution-Data Optimized (EVDO) only coverage area 542 to a 1×-only coverage area 540. The operating system (OS) may initially establish data connectivity over Evolution-Data Optimized (EVDO) through the first modem 105*a*. Then, the user equipment (UE) 504 may move to the 1×-only coverage area 540. The first modem 105*a* may report a loss of data connectivity over Evolution-Data Optimized (EVDO) to the operating system (OS). The second modem 105*b* may report data connectivity over 1× to the operating system (OS). This may be referred to as the third scenario 543*c*.

Figure 5D:
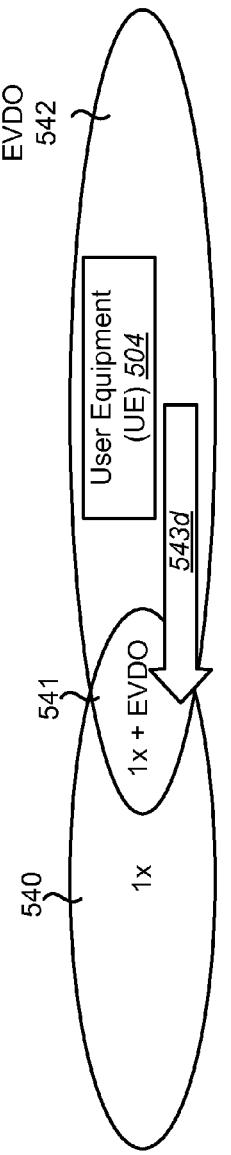
FIG. 5D depicts a scenario where the user equipment (UE) moves from an Evolution-Data Optimized (EVDO) only coverage area to an Evolution-Data Optimized (EVDO) and 1×coverage area.

FIG. 5D depicts a scenario where the user equipment (UE) 504 moves from an Evolution-Data Optimized (EVDO) only coverage area 542 to an Evolution-Data Optimized (EVDO) and 1× coverage area 541. Data connectivity may be initially established over Evolution-Data Optimized (EVDO) through the first modem 105*a* by the operating system (OS). Then, the user equipment (UE) 504 may move to an Evolution-Data Optimized (EVDO) and 1× coverage area 541 where there is both Evolution-Data Optimized (EVDO) and 1× connectivity. The second modem 105*b* may report a capability of connectivity over 1× to the operating system (OS). The first modem may not report a change in connectivity over Evolution-Data Optimized (EVDO). This may be referred to as the fourth scenario 543*d*. In the fourth scenario 543*d*, it may generally be preferable to maintain the Evolution-Data Optimized (EVDO) data connectivity via the first modem 105*a* rather than switch to the 1× data connectivity via the second modem 105*b*.

Figure 5E:
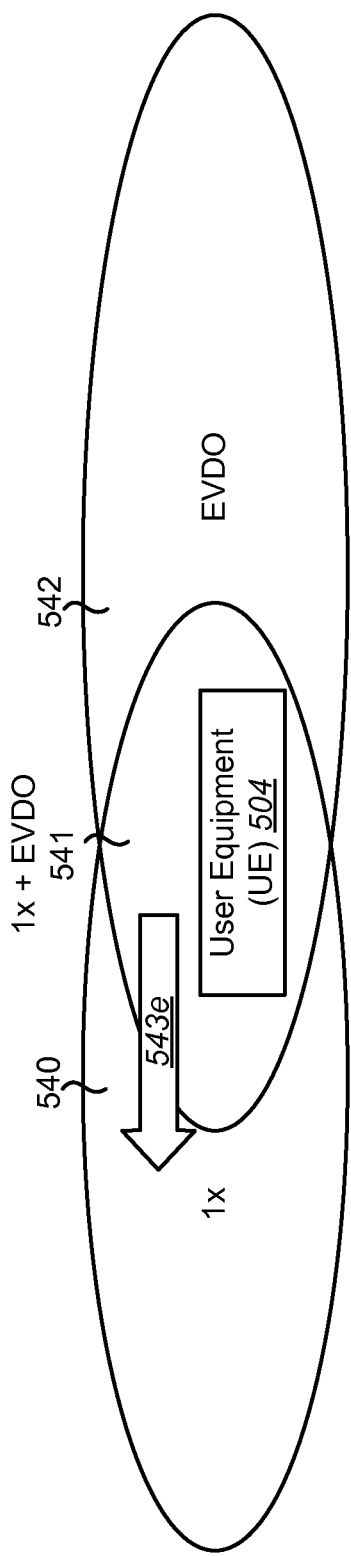
FIG. 5E depicts a scenario where the user equipment (UE) moves from a 1× and Evolution-Data Optimized (EVDO) connectivity coverage area to a coverage area with 1×-only data connectivity.

FIG. 5E depicts a scenario where the user equipment (UE) 504 moves from a 1× and Evolution-Data Optimized (EVDO) connectivity coverage area 541 to a coverage area 540 with 1×-only data connectivity. Initially, the first modem 105*a* may report Evolution-Data Optimized (EVDO) connectivity and the second modem 105*b* may report connectivity. The operating system (OS) may establish connectivity over Evolution-Data Optimized (EVDO) through the first modem 105*a*. Then, the user equipment (UE) 504 may move to a coverage area 540 where there is only 1× connectivity. The first modem 105*a* may report a loss of connectivity over Evolution-Data Optimized (EVDO) to the operating system (OS). This may be referred to as the fifth scenario 543*e*.

Figure 5F:
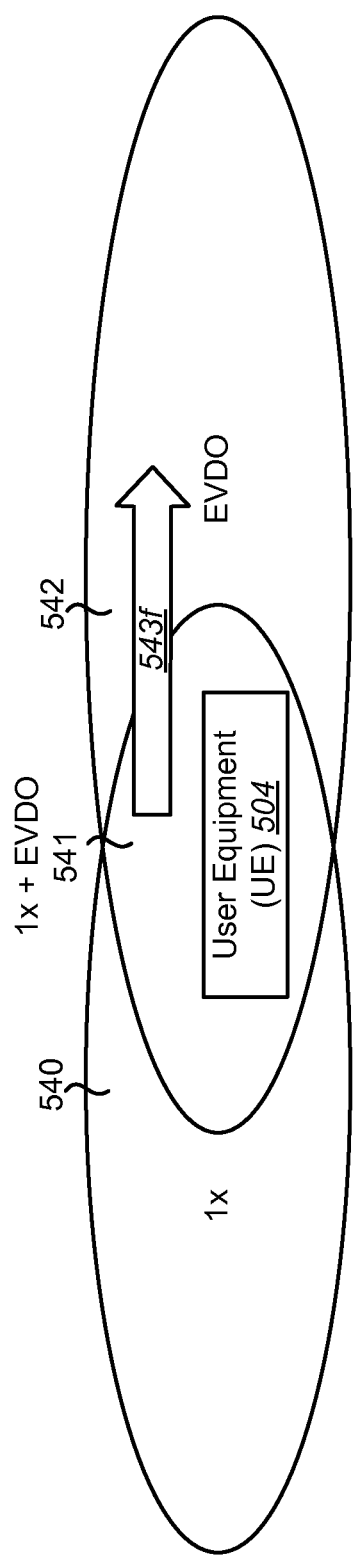
FIG. 5F depicts a scenario where the user equipment (UE) moves from a coverage area with both 1× and Evolution-Data Optimized (EVDO) connectivity to a coverage area with only Evolution-Data Optimized (EVDO) connectivity.

FIG. 5F depicts a scenario where the user equipment (UE) 504 moves from a coverage area 541 with both 1× and Evolution-Data Optimized (EVDO) connectivity to a coverage area 542 with only Evolution-Data Optimized (EVDO) connectivity. Initially, the first modem 105*a* may report Evolution-Data Optimized (EVDO) connectivity and the second modem 105*b* may report 1× connectivity. Data connectivity may be established over Evolution-Data Optimized (EVDO) through the first modem 105*a* by the operating system (OS). Then, the user equipment (UE) 504 may move to a coverage area 542 where there is only Evolution-Data Optimized (EVDO) connectivity. The second modem 105*b* may report loss of connectivity over 1× to the operating system (OS). This may be referred to as the sixth scenario 543*f*.

FIG. 6 is a block diagram illustrating event-based inter-modem communications between a first modem 605*a* and a second modem 605*b*. The first modem 605*a* and the second modem 605*b* of FIG. 6 may be one configuration of the first modem 105*a* and the second modem 105*b* of FIG. 1. A framework may be implemented to allow the first modem 605*a* and the second modem 605*b* to communicate or share information with each other. Generally, each modem 605 may maintain state information for itself as well as state information for the other modem 605. The state information may include a data call state 207, a call type 210 and a call throttled state 212. The communication links between the first modem 605*a* and the second modem 605*b* may be direct physical links or indirect logical links.

In event-based inter-modem communications, one modem 605 may update its state information and then inform the other modem 605 of the state information change. For example, when the first modem 605*a* changes state, the first modem 605*a* may send a state update message 644 to the second modem 605*b* that indicates the new state of the first modem 605*a*. Similarly, when the second modem 605*b* changes state, the second modem 605*b* may send a sate update message 646 to the first modem 605*a* that indicates the new state of the second modem 605*b*.

FIG. 7 is a block diagram illustrating query and response inter-modem communications between a first modem 705*a* and a second modem 705*b*. The first modem 705*a* and the second modem 705*b* of FIG. 7 may be one configuration of the first modem 105*a* and the second modem 105*b* of FIG. 1. In this implementation, one modem 705 may query the state of the other modem 705. The other modem 705 may then respond with its current state. For example, the first modem 705*a* may want to check the state of the second modem 705*b*. The first modem 705*a* may send a state query request 747 to the second modem 705*b*. The second modem 705*b* may respond with a state report 748. Similarly, the second modem 705*b* may send a state query request 750 to the first modem 705*a* and the first modem 705*a* may respond with a state report 749. In one configuration, the inter-modem communications may include both an event-based mechanism and a query and response mechanism.

Inter-modem communications may be used to minimize certain types of problems that occur when a user equipment (UE) 104 interacts with a core network 299 providing two air interface technologies supported on different modems 705 of the user equipment (UE) 104. One such problem that may arise is when a user equipment (UE) 104 with multiple modems 705 moves from one air interface coverage area into another air interface coverage area or into an overlapping coverage area (i.e., a coverage area that supports both the air interface technology of the prior coverage area and another air interface technology). The parallel activities for connection establishment via one air interface and connection teardown on another air interface may result in a termination request from the first modem 705*a* terminating a connection setup of the second modem 705*b* (e.g., a new Point-to-Point Protocol (PPP) connection request to establish data connectivity through the second modem 705*b*). Without inter-modem communication of state information, the two modems 705 may not be aware of each other and may send unsynchronized messages to the core network 299. The unsynchronized messages may result in the call setup over the preferred air interface 106 being terminated by the network in response to a disconnect request sent over the less-preferred air interface 106.

Figure 8:
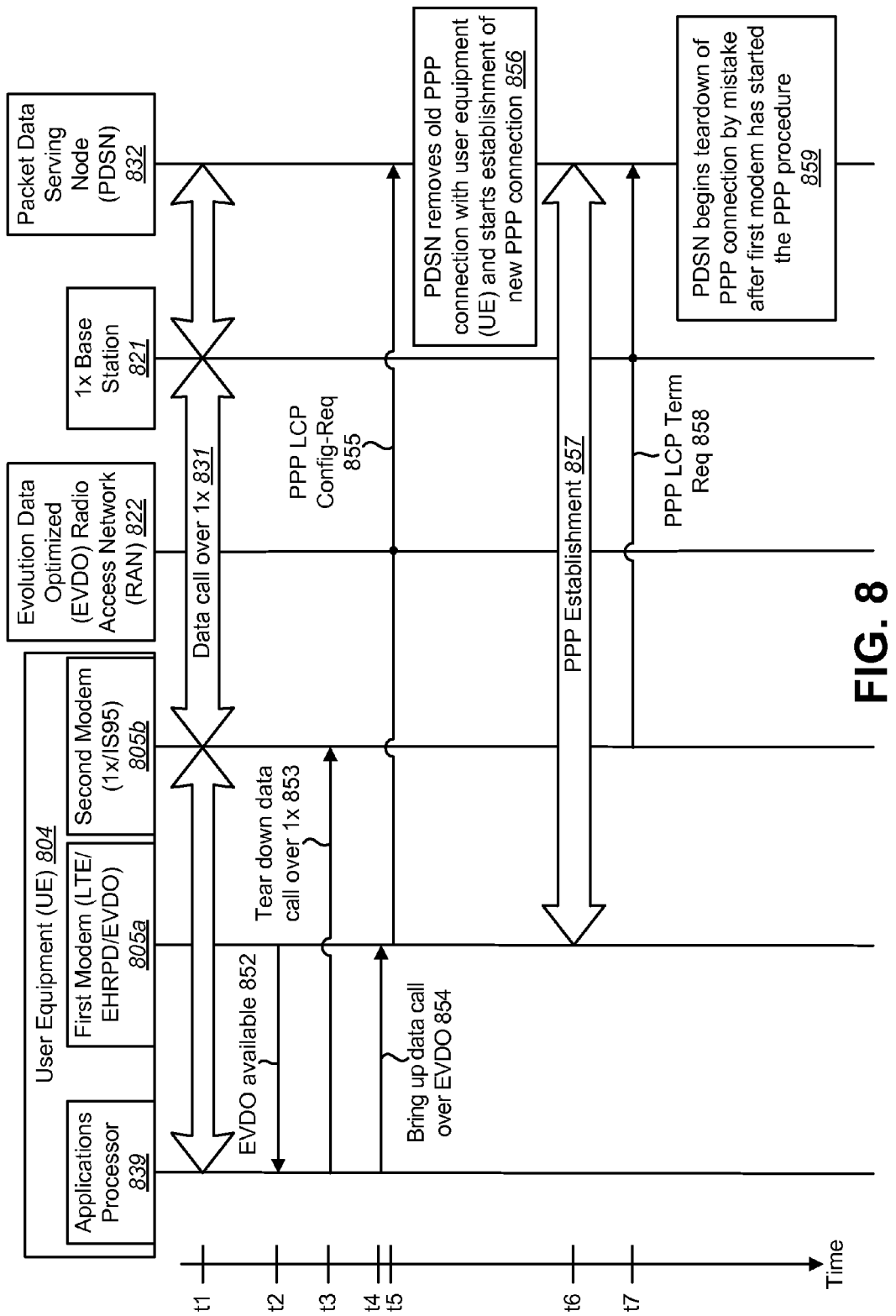
FIG. 8 is a call flow diagram illustrating one scenario involving unsynchronized messages from two modems on a user equipment (UE)

FIG. 8 is a call flow diagram illustrating one scenario involving unsynchronized messages from two modems 805*a-b* on a user equipment (UE) 804. The user equipment (UE) 804 of FIG. 8 may be one configuration of the user equipment (UE) 104 of FIG. 1. The user equipment (UE) 804 may include an applications processor 839, a first modem 805a providing LTE/EHRPD/EVDO connectivity and a second modem 805b providing 1×/IS95 connectivity. The network may include an Evolution-Data Optimized (EVDO) radio access network (RAN) 822, a 1× base station 821 and a Packet Data Serving Node (PDSN) 832. Initially, at time $t_1$, a data call 831 via a 1× air interface of the second modem 805b may provide Internet Protocol (IP) connectivity for an application (e.g., a web browser running on the applications processor 839). The data connectivity may be established from the web browser to the Internet 230 via the applications processor 839, the second modem 805b, the 1× base station 821 and the Packet Data Serving Node (PDSN) 832.

The second modem 805b may have an existing Point-to-Point Protocol (PPP) connection with the Packet Data Serving Node (PDSN) 832. At time $t_2$, Evolution-Data Optimized (EVDO) connectivity may become available. The first modem 805a may report 852 that Evolution-Data Optimized (EVDO) is available to the applications processor 839. The applications processor 839 may decide to switch to an Evolution-Data Optimized (EVDO) connection because it may provide better data service. At time $t_3$, the applications processor 839 may signal 853 the second modem 805b to tear down the 1× data connection. At time $t_4$, the applications processor 839 may signal 854 the first modem 805a to bring up a data call over the Evolution-Data Optimized (EVDO) air interface 106. At time $t_5$, the first modem 805a may send a Point-to-Point Protocol (PPP) Link Control Protocol (LCP) Configuration Request (Config-Req) message 855 to the Packet Data Serving Node (PDSN) 832 to set up the Evolution-Data Optimized (EVDO) connection.

Because the Packet Data Serving Node (PDSN) 832 may not be aware that there are two modems 805 in the user equipment (UE) 804 capable of connecting to the Packet Data Serving Node (PDSN) 832, the Packet Data Serving Node (PDSN) 832 may automatically remove 856 the old Point-to-Point Protocol (PPP) connection with the user equipment (UE) 804 (to tear down the 1× connection) and initiate a new Point-to-Point Protocol (PPP) connection with the user equipment (UE) 804 to establish the Evolution-Data Optimized (EVDO) connection via the first modem 805a. At time $t_6$, the new Point-to-Point Protocol (PPP) connection 857 may be established between the first modem 805a and the Packet Data Serving Node (PDSN) 832. At time $t_7$, the second modem 805b may send a Point-to-Point Protocol (PPP) Link Control Protocol (LCP) termination request (Term Req) message 858 to the Packet Data Serving Node (PDSN) 832 (as part of the tear down process for the 1× connection). The Packet Data Serving Node (PDSN) 832 may think the termination request is for the just established Point-to-Point Protocol (PPP) connection 857 because the Packet Data Serving Node (PDSN) 832 typically only supports one Point-to-Point Protocol (PPP) connection with the user equipment (UE) 804. As a result, the Packet Data Serving Node (PDSN) 832 may begin the teardown 859 of the Evolution-Data Optimized (EVDO) connection by mistake when the first modem 805a establishes a new Point-to-Point Protocol (PPP) connection 857 with the Packet Data Serving Node (PDSN) 832 and the second modem 805b tears down an existing Point-to-Point Protocol (PPP) connection with the Packet Data Serving Node (PDSN) 832 in parallel.

Figure 9:
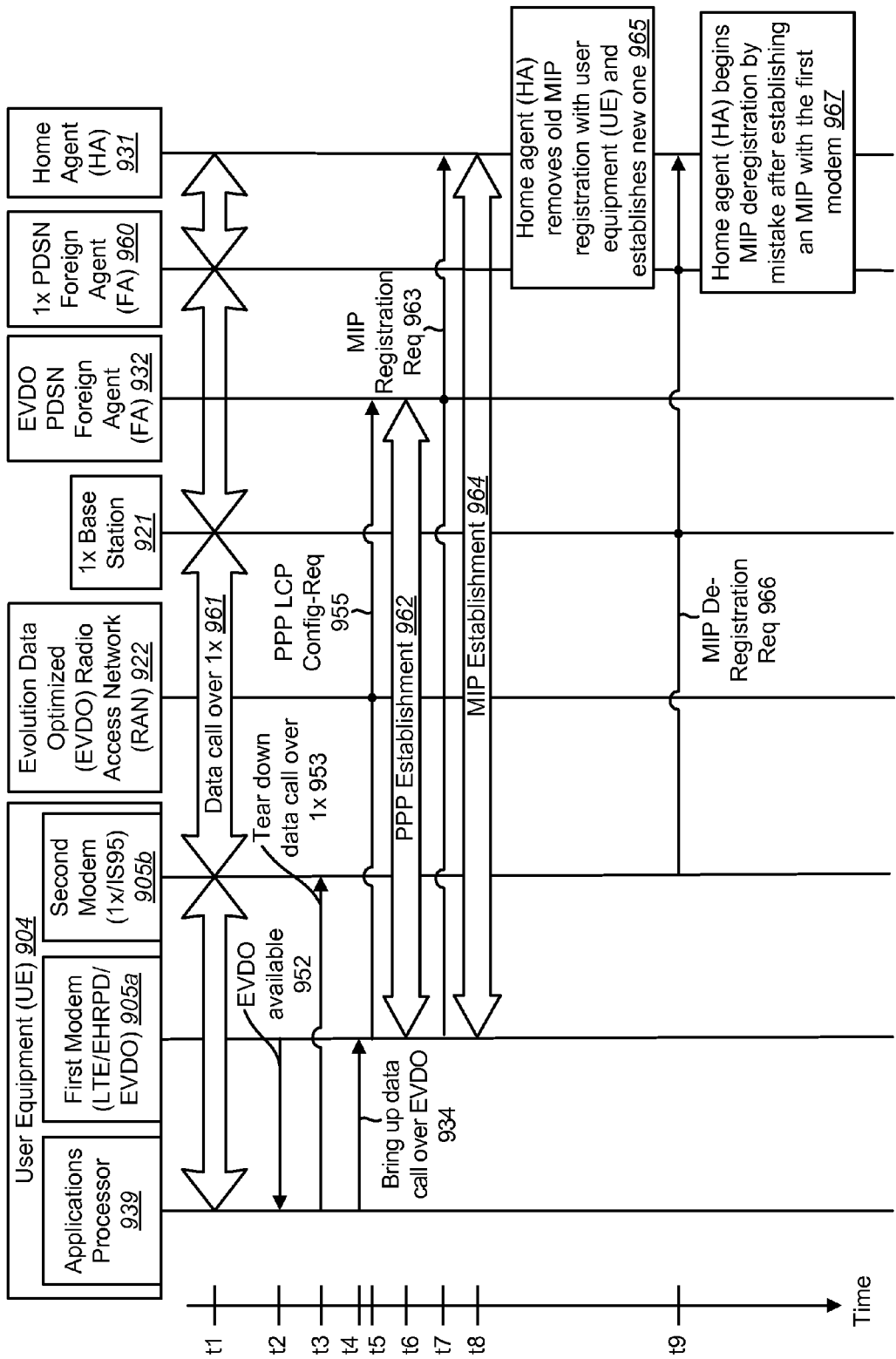
FIG. 9 is a call flow diagram illustrating another scenario involving unsynchronized messages from two modems on a user equipment (UE)

FIG. 9 is a call flow diagram illustrating another scenario involving unsynchronized messages from two modems 905a-b on a user equipment (UE) 904. The user equipment (UE) 904 may include an applications processor 939, a first modem 905a to provide LTE/EHRPD/EVDO connectivity and a second modem 905b to provide 1×/IS95 connectivity. The network may include an Evolution-Data Optimized (EVDO) radio access network (RAN) 922, a 1× base station 921, an Evolution-Data Optimized (EVDO) Packet Data Serving Node (PDSN)/foreign agent (FA) 932, a 1× Packet Data Serving Node (PDSN)/foreign agent (FA) 960 and a home agent (HA) 931. It is to be appreciated that current network configurations may utilize a common Packet Data Serving Node (PDSN)/foreign agent (FA) 832 as depicted in FIG. 8 or different Packet Data Serving Node (PDSN)/foreign agents (FAs) 932, 960 for each air interface 106 as depicted in FIG. 9. While different Packet Data Serving Node (PDSN)/foreign agents (FAs) 932, 960 may avoid the problem at the Packet Data Serving Node (PDSN)/foreign agent (FA) 832, as illustrated in FIG. 8, utilization of different Packet Data Serving Node (PDSN)/foreign agents (FAs) 932, 960 generally will not avoid the problem that arises at the home agent (HA) 931, as described in detail below.

At time $t_1$, a data connection 961 from a web browser to the Internet 230 using Mobile IP (MIP) services may be established via the applications processor 939, the second modem 905b, the 1× base station 921, the 1× Packet Data Serving Node (PDSN)/foreign agent (FA) 960 and the home agent (HA) 931. The second modem 905b may have an existing Point-to-Point Protocol (PPP) connection with the 1× Packet Data Serving Node (PDSN)/foreign agent 960.

At time $t_2$, Evolution-Data Optimized (EVDO) connectivity may become available. The first modem 905a may report 952 Evolution-Data Optimized (EVDO) connectivity to the applications processor 939. The applications processor 939 may decide to switch to an Evolution-Data Optimized (EVDO) connection for the MIP service because it may provide better data service. At time $t_3$, the applications processor 939 may signal 953 the second modem 905b to tear down the 1× data connection. At time $t_4$, the applications processor 939 may signal 934 the first modem 905a to establish a data connection with the Evolution-Data Optimized (EVDO) Packet Data Serving Node (PDSN)/foreign agent (FA) 932 over an Evolution-Data Optimized (EVDO) air interface 106. At time $t_5$, the first modem 905a may send a Point-to-Point Protocol (PPP) Link Control Protocol (LCP) Configuration Request message 955 to the Evolution-Data Optimized (EVDO) Packet Data Serving Node (PDSN)/foreign agent (FA) 932 to set up the Evolution-Data Optimized (EVDO) connection. At time $t_6$, a Point-to-Point Protocol (PPP) connection may be established 962 between the first modem 905a and the Evolution-Data Optimized (EVDO) Packet Data Serving Node (PDSN)/foreign agent (FA) 932. At time $t_7$, the first modem 905a may send an MIP Registration request message 963 via the Evolution-Data Optimized (EVDO) radio access network (RAN) 922 and the Evolution-Data Optimized (EVDO) Packet Data Serving Node (PDSN)/foreign agent (FA) 932 to the home agent (HA) 931 to establish a Mobile IP (MIP) service. At time $t_8$, a Mobile IP (MIP) Service may be established 964 between the first modem 905a and the home agent (HA) 931.

Because the home agent (HA) 931 may not be aware that there are two modems 905 in the user equipment (UE) 904 capable of establishing a MIP session with the home agent (HA) 931, the home agent (HA) 931 may automatically remove 965 the old MIP registration with the user equipment (UE) 904 (i.e., tear down the 1× connection) and establish a new MIP registration with the user equipment (UE) 904 for the Evolution-Data Optimized (EVDO) connection via the first modem 905a. At time $t_9$, the second modem 905b may send an MIP de-registration request message 966 via the 1× base station 921 and the 1× Packet Data Serving Node (PDSN)/foreign agent (FA) 960 to the home agent (HA) 931 (as part of the teardown process of the MIP service over the 1× connection).

The home agent (HA) 931 may think the MIP de-registration request message 966 is for the newly established MIP connection because the home agent (HA) 931 typically only supports one MIP connection with the user equipment (UE) 904. As a result, the home agent (HA) 931 may begin 967 MIP deregistration by mistake. The home agent (HA) 931 may terminate the Evolution-Data Optimized (EVDO) connection when the first modem 905a establishes an MIP connection with the home agent (HA) 931 and the second modem 905b tears down an MIP connection with the home agent (HA) 931 in parallel. To minimize the above connection issues, the first modem 905a and the second modem 905b may coordinate their activities to ensure their actions occur in a synchronized manner.

Figure 10:
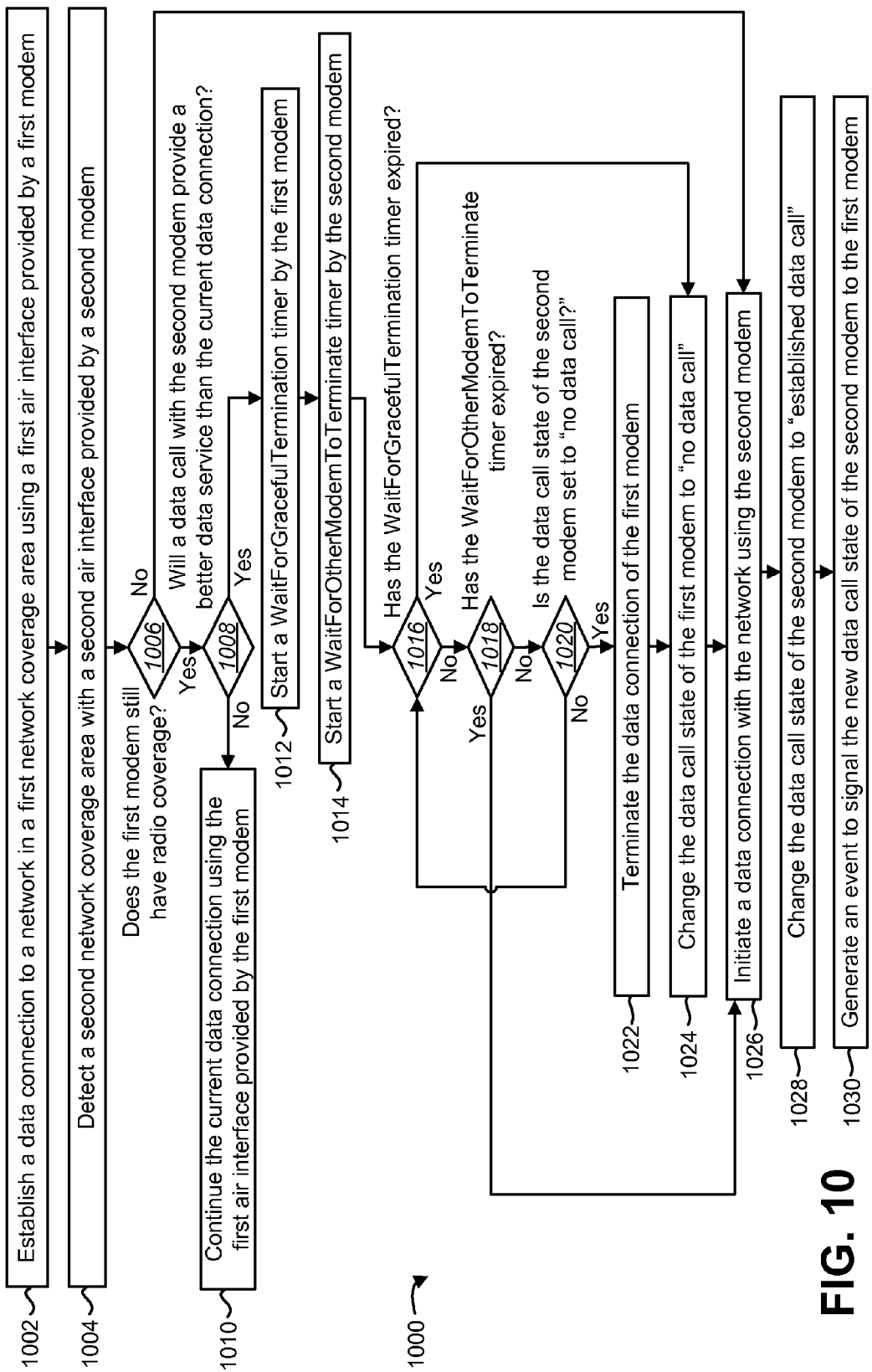
FIG. 10 is a flow diagram of a method for inter-modem coordination.

FIG. 10 is a flow diagram of a method 1000 for inter-modem coordination. The method 1000 may be performed by a first modem 105a and a second modem 105b on a user equipment (UE) 104. The first modem 105a may establish 1002 a data connection to a network in a first network coverage area using a first air interface 106a. The user equipment (UE) 104 may then detect 1004 a second network coverage area with a second air interface 106b provided by a second modem 105b. The second network coverage area may include both the first air interface 106a and the second air interface 106b. Alternatively, the second network coverage area may include only the second air interface 106b.

The first modem 105a may determine 1006 whether it still has radio coverage (i.e., whether the second network coverage area includes both the first air interface 106a and the second air interface 106b or only the second air interface 106b). If the first modem 105a does not have radio coverage, the user equipment (UE) 104 may initiate 1026 a data connection with the network using the second air interface 106b provided by the second modem 105b. If the first modem 105a does have radio coverage, the user equipment (UE) 104 may determine 1008 whether a data call with the second modem 105b will provide better data service than the current data connection. If a data call with the second modem 105b will not provide better data service than the current data connection, the user equipment (UE) 104 may continue 1010 the current data connection to the network using the first air interface 106a provided by the first modem 105a.

If a data call with the second modem 105b will provide better data service than the current data connection, the first modem 105a may start 1012 a WaitForGracefulTermination timer 208. The second modem 105b may start 1014 a WaitForOtherModemToTerminate timer 209. The user equipment (UE) 104 may determine 1016 whether the WaitForGracefulTermination timer 208 on the first modem 105a has expired. If the WaitForGracefulTermination timer 208 has expired, the user equipment (UE) 104 may change 1024 the data call state 207 of the first modem 105a to "no data call." If the WaitForGracefulTermination timer 208 has not expired, the user equipment (UE) 104 may determine 1018 whether the WaitForOtherModemToTerminate timer 209 on the second modem 105b has expired.

If the WaitForOtherModemToTerminate timer 209 on the second modem 105b has expired, the user equipment (UE) 104 may initiate 1026 a data connection with the network using the second modem 105b. If the WaitForOtherModemToTerminate timer 209 on the second modem 105b has not expired, the user equipment (UE) 104 may determine 1020 whether the data call state 207 of the second modem 105b is set to "no data call." If the data call state 207 of the second modem 105b is not set to "no data call," the user equipment (UE) 104 may again determine 1016 whether the WaitForGracefulTermination timer 208 has expired. If the data call state 207 of the second modem 105b is set to "no data call," the user equipment (UE) 104 may terminate 1022 the data connection of the first modem 105a. The user equipment (UE) 104 may then change 1024 the data call state 207 of the first modem 105a to "no data call."

Once the user equipment (UE) 104 has changed 1024 the data call state 207 of the first modem 105a to "no data call," the user equipment (UE) 104 may initiate 1026 a data connection with the network using the second air interface 106b provided by the second modem 105b. The user equipment (UE) 104 may then change 1028 the data call state 207 of the second modem 105b to "data call established." The second modem 105b may generate 1030 an event to signal the new data call state 207 to the first modem 105a.

Figure 11:
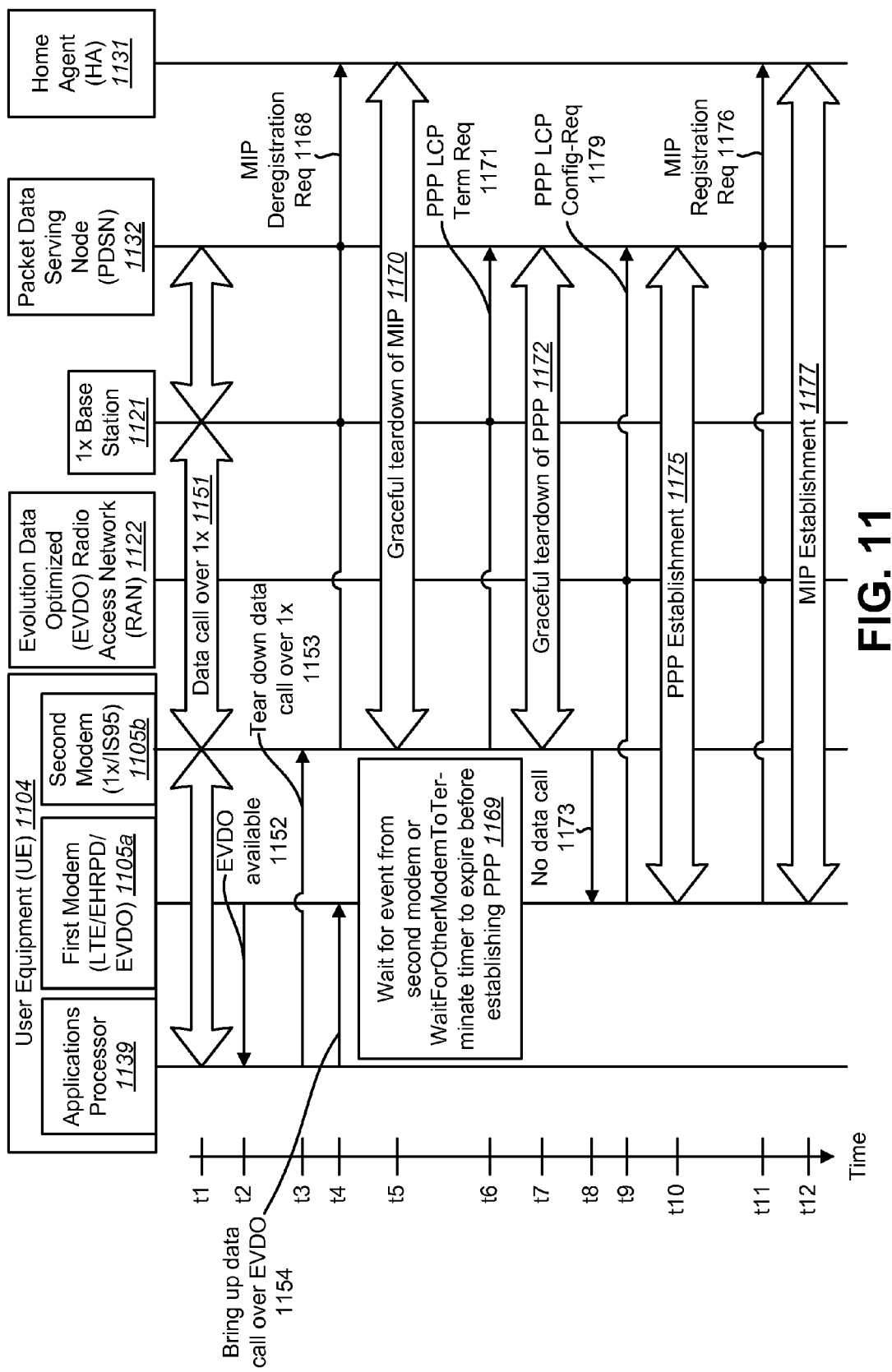
FIG. 11 is a call flow diagram illustrating a scenario involving synchronized messages from two modems on a user equipment (UE)

FIG. 11 is a call flow diagram illustrating a scenario involving synchronized messages from two modems 1105a-b on a user equipment (UE) 1104. The user equipment (UE) 1104 may include an applications processor 1139, a first modem 1105a providing LTE/EHRPD/EVDO connectivity and a second modem 1105b providing 1×/IS95 connectivity. The user equipment (UE) 1104 may communicate with a network. The network may include an Evolution-Data Optimized (EVDO) radio access network (RAN) 1122, a 1× base station 1121, a Packet Data Serving Node (PDSN) 1132 and a home agent (HA) 1131. At time $t_1$, the user equipment (UE) 1104 may be in a coverage area with only 1× air interface connectivity. A data call 1151 may be set up via the second modem 1105b over 1×. Then, the user equipment (UE) 1104 may move from the 1×-only coverage area to a coverage area with both Evolution-Data Optimized (EVDO) and 1× air interface connectivity. At time $t_2$, the first modem 1105a may report 1152 Evolution-Data Optimized (EVDO) connectivity to the operating system (OS) on the applications processor 1139. At time $t_3$, the operating system (OS) on the applications processor 1139 may signal 1153 the second modem 1105b to tear down the data call over the 1× air interface. At time $t_4$, the operating system (OS) may signal 1154 the first modem 1105a to bring up a data call over the Evolution-Data Optimized (EVDO) air interface 106.

At time $t_4$, the second modem 1105b may not act immediately to tear down the existing data call over the 1× air interface. The second modem 1105b may instead query the first modem 1105a to determine the data call state 207 of the first modem 1105a. If the data call state 207 of the first modem 1105a is other than "No data call," the second modem 1105b may not take any further action. However, if the first modem 1105a is in the "No data call" state, the second modem 1105b may change its data call state 207 to "Data call being torn down over 1×" and generate an event to signal the change in data call state 207 (not shown). The second modem 1105b may also start a WaitForGracefulTermination timer 208. The WaitForGracefulTermination timer 208 may be a failsafe mechanism to prevent the second modem 1105b from waiting indefinitely for the 1× data call to be torn down. The second modem 1105b may then gracefully complete MIP deregistration with the home agent (HA) by exchanging MIP deregistration request 1168/response messages with the home agent (HA) 1131. The first modem 1105a may wait 1169 for an event 1173 from the second modem 1105b indicating the data call state is "no data call" or for the WaitForOtherModemToTerminate timer 209 to expire before establishing the Point-to-Point Protocol (PPP) connection with the Packet Data Serving Node (PDSN) 1132.

At time t$_5$, the graceful teardown 1170 of the MIP connection occurs. Then, at time t$_6$, the second modem 1105*b* may gracefully terminate the Point-to-Point Protocol (PPP) connection with the Packet Data Serving Node (PDSN) 1132 by sending a Point-to-Point Protocol (PPP) Link Control Protocol (LCP)/Term Request 1171 to the Packet Data Serving Node (PDSN) 1132 and receiving an acknowledgement from the Packet Data Serving Node (PDSN) 1132. At time t$_7$, the graceful teardown 1172 of the Point-to-Point Protocol (PPP) connection between the second modem 1105*b* and the Packet Data Serving Node (PDSN) 1132 may be complete.

At time t$_8$, after the second modem 1105*b* completes the MIP deregistration and terminates the Point-to-Point Protocol (PPP) connection with the Packet Data Serving Node (PDSN) 1132, the second modem 1105*b* may change its data call state 207 to "No data call" and generate an event 1173 to signal the change in data call state 207 to the first modem 1105*a*. Alternatively, the WaitForGracefulTermination timer 208 may expire first. The second modem 1105*b* may then automatically change its data call state 207 to "No data call" and generate an event 1173 to signal the change in data call state 207 to the first modem 1105*a*. Upon changing the data call state 207 to "No data call," the second modem 1105*b* may free up internal software resources associated with the data call.

In one configuration, the first modem 1105*a* may wait 1169 for certain events 1173 from the second modem 1105*b* prior to taking action to establish a data call over Evolution-Data Optimized (EVDO). For example, the first modem 1105*a* may wait for the events "Data Call being torn down over X" and "No data call" from the second modem 1105*b*. Additionally, the first modem 1105*a* may start a WaitForOtherModemToTerminate timer 209. The WaitForOtherModemToTerminate timer 209 may be a failsafe to ensure that the first modem 1105*a* does not wait indefinitely for the second modem 1105*b* to change its data call state 207 to "No data call."

At time t$_8$, the first modem 1105*a* may receive the event 1173 "No data call" from the second modem 1105*b* (alternatively, the WaitForOtherModemToTerminate timer 209 may expire). The first modem 1105*a* may begin initiation of the data call over Evolution-Data Optimized (EVDO). The first modem 1105*a* may change its data call state 207 to "Bringing up data call over Evolution-Data Optimized (EVDO)" and generate an event (not shown) signaling the change in data call state 207 to the second modem 1105*b*. Then, at time t$_9$, the first modem 1105*a* may start a Point-to-Point Protocol (PPP) negotiation with the Packet Data Serving Node (PDSN) 1132 by exchanging Point-to-Point Protocol (PPP) Link Control Protocol (LCP) Config-Req 1179, Authentication and Internet Protocol Control Protocol (IPCP) messages via the Evolution-Data Optimized (EVDO) radio access network (RAN) 1122. At time t$_{10}$, a Point-to-Point Protocol (PPP) connection between the first modem 1105*a* and the Packet Data Serving Node (PDSN) 1132 may be established 1175. Then, at time t$_{11}$, the first modem 1105*a* may set up an MIP call with the home agent (HA) 1131 by sending an MIP Registration Request message 1176 to the home agent (HA) 1131 and receiving a response message from the home agent (HA) 1131. At time t$_{12}$, the first modem 1105*a* may change its data call state 207 to "Data Call established over Evolution-Data Optimized (EVDO)," as the MIP has been established 1177. The first modem 1105*a* may also generate an event (not shown) to signal the new data call state 207 to the second modem 1105*b*.

FIG. 11 is specific for the first scenario 543*a* depicted FIG. 5A. In the second scenario 543*b*, depicted in FIG. 5B, the user equipment (UE) 1104 may move from an area 540 of 1×-only coverage to an area of Evolution-Data Optimized (EVDO)-only coverage 542. The second modem 1105*b* may not be able to send Point-to-Point Protocol (PPP) or MIP messages over the air to tear down the Point-to-Point Protocol (PPP) and MIP gracefully because there is no radio coverage. Thus, the WaitForOtherModemToTerminate timer 209 may expire on the first modem 1105*a*. In one configuration, the first modem 1105*a* may discover that the second modem 1105*b* does not have radio coverage and cannot send over-the-air (OTA) messages. Therefore, the first modem 1105*a* may not have to wait for the WaitForOtherModemToTerminate timer 209 to expire.

In the third scenario 543*c*, depicted in FIG. 5C, the user equipment (UE) 1104 may move from an area 542 of Evolution-Data Optimized (EVDO)-only coverage to an area 540 of 1×-only coverage. In this scenario, the roles of the first modem 1105*a* and the second modem 1105*b* are interchanged. The first modem 1105*a* will not be able to send Point-to-Point Protocol (PPP) or MIP messages over the air to tear down the Point-to-Point Protocol (PPP) and MIP gracefully because there is no radio coverage. Therefore, the WaitForOtherModemToTerminate timer 209 on the second modem 1105*b* may expire.

In the fourth scenario 543*d*, depicted in FIG. 5D, the user equipment (UE) 1104 may move from an area 542 of Evolution-Data Optimized (EVDO) only coverage to an area 541 of both Evolution-Data Optimized (EVDO) and 1× coverage. In this scenario, the above procedure may not be executed to tear down the Evolution-Data Optimized (EVDO) connection and establish a 1× connection because the operating system (OS) on the applications processor 1139 may retain the existing data connection over Evolution-Data Optimized (EVDO). There may be no reason to tear it down because the Evolution-Data Optimized (EVDO) air interface 106 may offer better data rates than the 1× air interface.

In the fifth scenario 543*e*, depicted in FIG. 5E, the user equipment (UE) 1104 may move from an area 541 of both Evolution-Data Optimized (EVDO) and 1× coverage to an area 540 of only 1× coverage. This is similar to the third scenario 543*c*, depicted in FIG. 5C, in terms of results from the above procedure. The data call over Evolution-Data Optimized (EVDO) may be torn down and a new data call established over 1×. The first modem 1105*a* may not be able to send Point-to-Point Protocol (PPP) or MIP messages over the air to tear down the Point-to-Point Protocol (PPP) and MIP gracefully because there may be no radio coverage. Therefore, the WaitForOtherModemToTerminate timer 209 on the second modem 1105*b* may expire. In one configuration, the second modem 1105*b* may discover that the first modem 1105*a* has lost coverage and cannot send messages over the air, allowing the second modem 1105*b* to not wait for the WaitForOtherModemToTerminate timer 209 to expire.

In the sixth scenario 543*f*, depicted in FIG. 5F, the user equipment (UE) 1104 may move from an area 541 of both Evolution-Data Optimized (EVDO) and 1× coverage to an area 542 of only Evolution-Data Optimized (EVDO) coverage. Here, the above procedure may not be executed because the operating system (OS) on the applications processor 1139 may retain the existing data connection over the Evolution-Data Optimized (EVDO) air interface 106.

Figure 12:
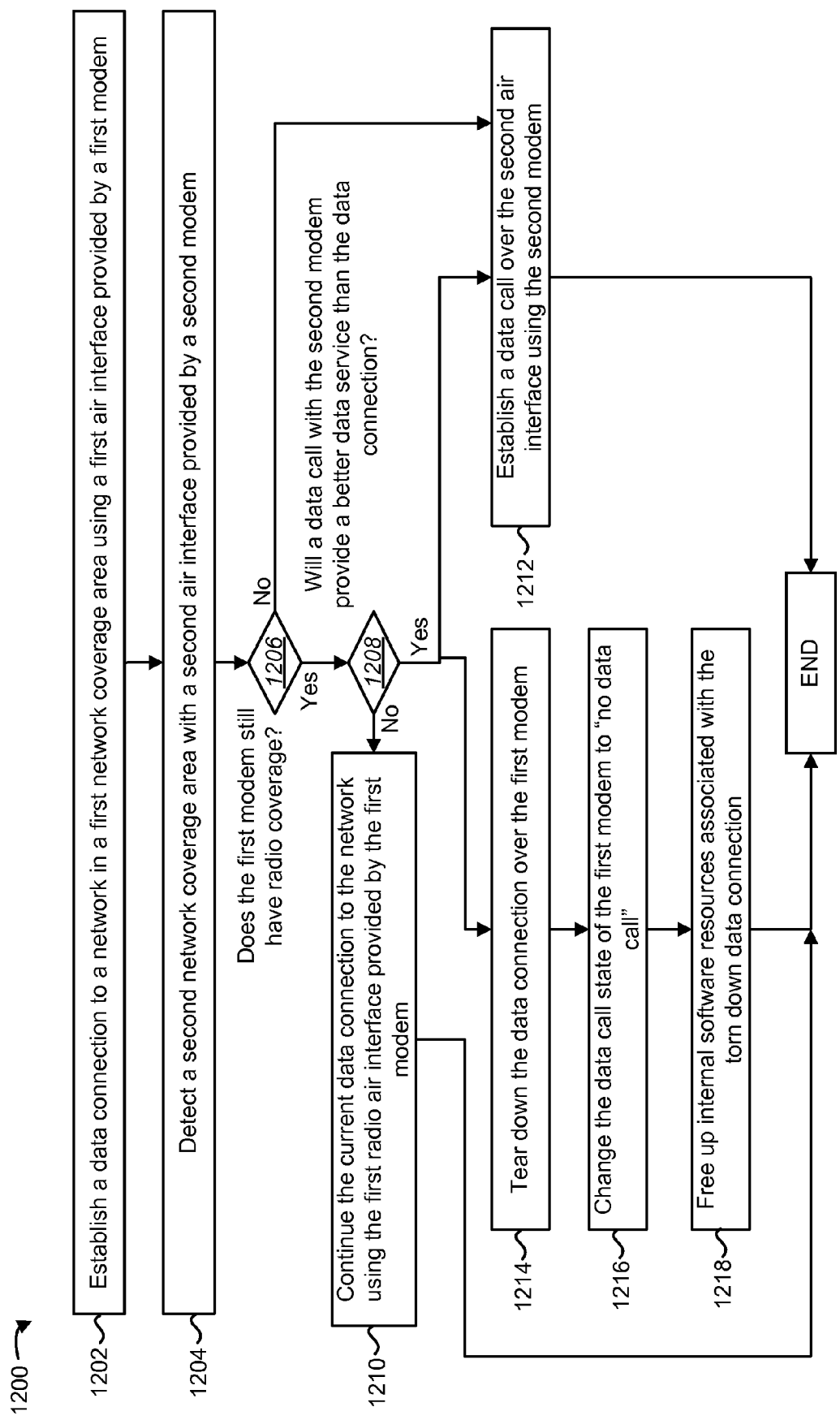
FIG. 12 is a flow diagram of another method for inter-modem coordination.

FIG. 12 is a flow diagram of another method 1200 for inter-modem coordination. The method 1200 may be performed by a first modem 105*a* and a second modem 105*b* on a user equipment (UE) 104. The user equipment (UE) 104 may establish 1202 a data connection to a network in a first network coverage area using a first air interface 106*a* provided by the first modem 105*a*. The user equipment (UE) 104 may then detect 1204 a second network coverage area with a second air interface 106*b* provided by the second modem 105*b*.

The user equipment (UE) 104 may determine 1206 whether the first modem 105*a* still has radio coverage. If the first modem 105*a* does not still have radio coverage, the user equipment (UE) 104 may establish 1212 a data call over the second air interface 106*b* using the second modem 105*b*. The method 1200 may then end. If the first modem 105*a* does still have radio coverage, the user equipment (UE) 104 may determine 1208 whether a data call with the second modem 105*b* will provide better data service than the current data connection. In one configuration, the user equipment (UE) 104 may use a table (e.g., a lookup table) to determine 1208 whether a data call with the second modem 105*b* will provide better data service than the current data connection. If a data call with the second modem 105*b* will not provide better data service than the current data connection, the user equipment (UE) 104 may continue 1210 the current data connection to the network using the first radio air interface 106*a* provided by the first modem 105*a*.

If a data call with the second modem 105*b* will provide better data service than the current data connection, the first modem 105*a* may tear down 1214 the current data connection over the first modem 105*a*. The first modem 105*a* may also change 1216 the data call state 207 of the first modem 105*a* to "no data call." The first modem 105*a* may further free up 1218 internal software resources associated with the torn down data connection. While the first modem 105*a* is performing method steps 1214-1218, the second modem 105*b* may establish 1212 a data call over the second air interface 106*b* using the second modem 105*b*. The method 1200 may then end.

Figure 13:
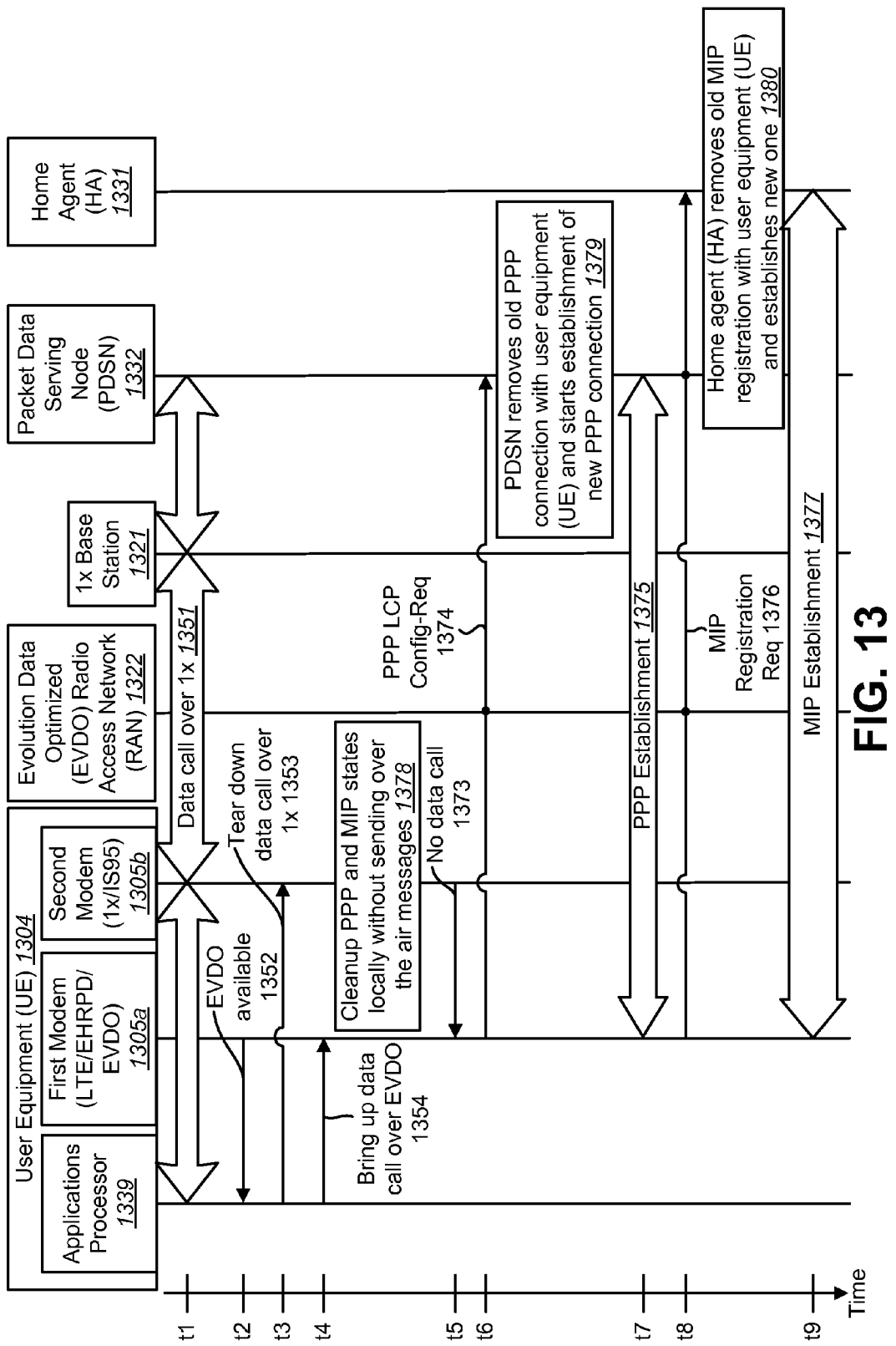
FIG. 13 is a call flow diagram illustrating a scenario involving communications from two modems on a user equipment (UE) that are not coordinated in time.

FIG. 13 is a call flow diagram illustrating a scenario involving communications from two modems 1305*a-b* on a user equipment (UE) 1304 that are not coordinated in time. In this configuration, the first modem 1305*a* and the second modem 1305*b* on the user equipment (UE) 1304 may not be required to coordinate their actions; this is due to the network behaving in certain ways.

As an example, when the network employs different Packet Data Serving Nodes (PDSNs) for 1× and Evolution-Data Optimized (EVDO), each Packet Data Serving Node (PDSN) may maintain a timer of inactivity for a Point-to-Point Protocol (PPP) connection because the Packet Data Serving Node (PDSN) may not receive a Point-to-Point Protocol (PPP) termination request from one or both modems 1305. Alternatively, when a single Packet Data Serving Node (PDSN) 1332 is employed for both 1× and Evolution-Data Optimized (EVDO), the Packet Data Serving Node (PDSN) 1332 may terminate an existing Point-to-Point Protocol (PPP) connection with a user equipment (UE) 1304 when the Packet Data Serving Node (PDSN) 1332 has an existing A10 link 225*a* with the 1× base station 1321 and the Packet Data Serving Node (PDSN) 1332 receives a new A10 establishment request from the Evolution-Data Optimized (EVDO) radio access network (RAN) 1322 to setup a Point-to-Point Protocol (PPP) for the user equipment (UE) 1304 with the same International Mobile Subscriber Identity (IMSI). Further, the home agent (HA) 1331 may terminate an existing MIP registration with a user equipment (UE) 1304 via one foreign agent (FA) if the home agent (HA) 1331 receives another MIP registration request via another foreign agent (FA) for the same user equipment (UE) 1304 with the same IMSI.

The user equipment (UE) 1304 may include an applications processor 1339, a first modem 1305*a* providing LTE/EHRPD/EVDO connectivity and a second modem 1305*b* providing 1×/IS95 connectivity. The network may include an Evolution-Data Optimized (EVDO) radio access network (RAN) 1322, a 1× base station 1321, a Packet Data Serving Node (PDSN) 1332 and a home agent (HA) 1331. At time $t_1$, the user equipment (UE) 1304 may be in a coverage area 540 with only 1× air interface connectivity. A data call 1351 may be established over a 1× air interface via the second modem 1305*b*, the 1× base station 1321 and the Packet Data Serving Node (PDSN) 1332. Then, the user equipment (UE) 1304 may move from the area 540 of only 1× coverage to an area 541 of both Evolution-Data Optimized (EVDO) and 1× coverage. At time $t_2$, the first modem 1305*a* may report 1352 Evolution-Data Optimized (EVDO) connectivity to the operating system (OS) on the applications processor 1339. At time $t_3$, the operating system (OS) on the applications processor 1339 may signal 1353 the second modem 1305*b* to tear down the data call over the 1× air interface. At time $t_4$, the applications processor 1339 may signal 1354 the first modem 1305*a* to bring up a data call over the Evolution-Data Optimized (EVDO) air interface 106.

The second modem 1305*b* may act immediately to tear down or cleanup 1378 the existing data call over 1× locally on the user equipment (UE) 1304 and may not send over-the-air messages to the Packet Data Serving Node (PDSN) 1332. The second modem 1305*b* may consider itself MIP deregistered but may not exchange MIP messages with the home agent (HA) 1331. The second modem 1305*b* may also consider the Point-to-Point Protocol (PPP) terminated but may not exchange Point-to-Point Protocol (PPP) messages with the Packet Data Serving Node (PDSN) 1332. At time $t_5$, the second modem 1305*b* may change its data call state 207 to "No data call" and generate an event 1373 to inform the first modem 1305*a* of the change in data call state 207. The second modem 1305*b* may then free up internal software resources associated with the data call.

In parallel to the actions of the second modem 1305*b*, the first modem 1305*a* may immediately establish a data call over the Evolution-Data Optimized (EVDO) air interface 106. At time $t_6$, the first modem 1305*a* may negotiate a Point-to-Point Protocol (PPP) connection by exchanging Point-to-Point Protocol (PPP) Link Control Protocol (LCP) Config-Req 1374, Authentication and IPCP messages with the Packet Data Serving Node (PDSN) 1332. The Point-to-Point Protocol (PPP) connection may be established 1375 at time $t_7$. The PDSN may remove 1379 old Point-to-Point Protocol (PPP) connections with the user equipment (UE) 1304 and start the establishment of a new Point-to-Point Protocol (PPP) connection. Then, at time $t_8$, the first modem 1305*a* may send an MIP Registration Request message 1376 to the home agent (HA) 1331 and receive a response message from the home agent (HA) 1331. The home agent (HA) 1331 may remove 1380 the old MIP registration with the user equipment (UE) 1304 and establish a new MIP registration with the user equipment (UE) 1304. At time $t_9$, the MIP connection may be established 1377 between the first modem 1305*a* and the home agent (HA) 1331.

The procedures of FIG. 13 are described in the context of a user equipment (UE) 1304 with a 1× air interface 106 on the second modem 1305*b* and an Evolution-Data Optimized (EVDO) air interface 106 on the first modem 1305*a*. The procedures may be generalized and extended to any user equipment (UE) 1304 having two air interface technologies that connect to the same network node (e.g., a gateway or a home agent (HA) 1331).

Figure 14:
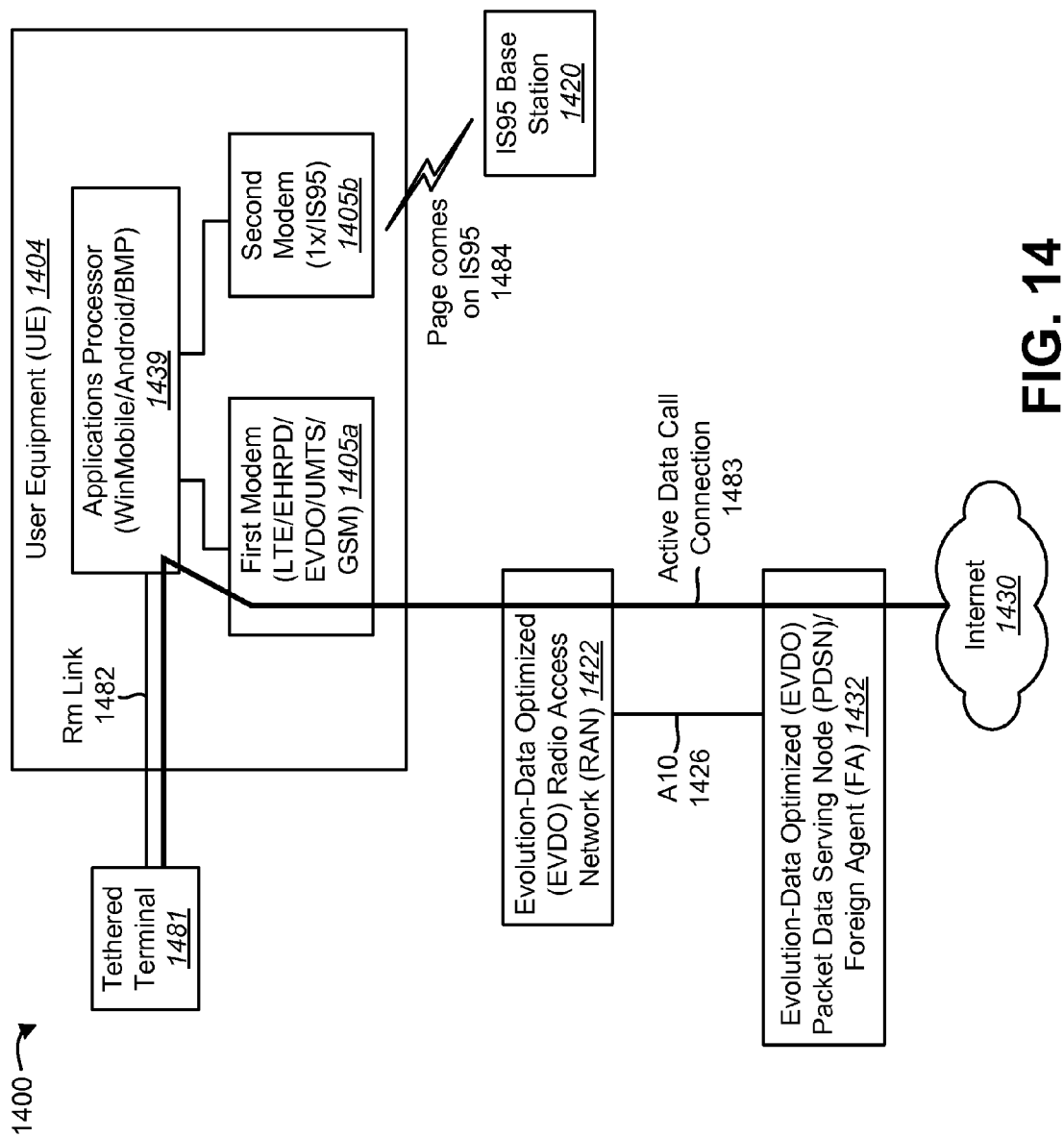
FIG. 14 is a block diagram illustrating a wireless communication system with a tethered terminal.

FIG. 14 is a block diagram illustrating a wireless communication system 1400 with a tethered terminal 1481. The wireless communication system 1400 may include a user equipment (UE) 1404. The user equipment (UE) 1404 may be in a coverage area of a LTE/EHRPD/EVDO/UMTS/GSM air interface 106 provided by a first modem 1405*a* and a coverage area of a 1x/IS95 air interface 106 provided by a second modem 1405*b*. The wireless communication system 1400 may include an Evolution-Data Optimized (EVDO) radio access network (RAN) 1422 and an Evolution-Data Optimized (EVDO) Packet Data Serving Node (PDSN)/foreign agent (FA) 1432 to provide connectivity to the Internet 1430. The wireless communication system 1400 may also include an IS95 base station 1420. Initially, a tethered terminal 1481 (e.g., a laptop) may desire an active data call connection 1483 to the Internet 1430 utilizing the user equipment (UE) 1404. The tethered terminal 1481 may be connected to the user equipment (UE) 1404 via a USB connection or a wireless connection. The operating system (OS) on an applications processor 1439 on the user equipment (UE) 1404 may instruct the first modem 1405*a* to establish an active data call connection 1483 between the tethered terminal 1481 and the Internet 1430. The active data call connection 1483 may be established via a Rm Link 1482 between the tethered terminal 1481 and the applications processor 1439, the first modem 1405*a*, the Evolution-Data Optimized (EVDO) radio access network (RAN) 1422 and the Evolution-Data Optimized (EVDO) Packet Data Serving Node (PDSN)/foreign agent (FA) 1432. Note that typically there is only one link between the user equipment (UE) 1404 and the tethered terminal 1481, which is referred to herein as an Rm link 1482.

The Evolution-Data Optimized (EVDO) radio access network (RAN) 1422 may employ an A10 connection 1426 to the Evolution-Data Optimized (EVDO) Packet Data Serving Node (PDSN)/foreign agent (FA) 1432 which in turn is connected to the Internet 1430. The connection between the tethered terminal 1481 and the Internet 1430 may be referred to as a tethered data call. While the tethered data call is active, the network may page 1484 the user equipment (UE) 1404 for a mobile terminated IS95 circuit-switched tethered data call or fax. When the user equipment (UE) 1404 answers the IS95 page 1484, the existing active data call connection 1483 may be torn down so that the second modem 1405*b* may utilize the Rm link 1482. This may result in the existing tethered data call being terminated.

In one configuration, inter-modem communication between the first modem 1405*a* and the second modem 1405*b* may be employed to prevent the active data call connection 1483 from being terminated when the user equipment (UE) 1404 is in a dual coverage area and the network pages the user equipment (UE) 1404 via another air interface 106. Evolution-Data Optimized (EVDO) and IS95 air interfaces 106 are used for purposes of illustration and not limitation.

When an IS95 page 1484 for a circuit switched data call or fax is received by the second modem 1405*b*, before answering the page 1484, the second modem 1405*b* may query the first modem 1405*a* to determine the data call state 207 of the first modem 1405*a*. When the data call state 207 of the first modem 1405*a* is "No data call," the second modem 1405*b* may answer and accept the IS95 page 1484. Additionally, a tethered circuit switched data call or fax with the tethered terminal 1481 via the applications processor 1439 on the Rm link 1482 may be set up (established).

When the data call state 207 of the first modem 1405*a* is any data call state 207 other than "No data call," the second modem 1405*b* may determine the type of data call on the first modem 1405*a*. When the type of data call on the first modem 1405*a* is "tethered," the second modem 1405*b* may reject the IS95 page 1484 because a data call over another air interface 106 may be utilizing the Rm link 1482. When the type of data call on the first modem 1405*a* is "embedded," the second modem 1405*b* may answer and accept the IS95 page 1484. Additionally, a tethered circuit switched data call or fax with the tethered terminal 1481 via the applications processor 1439 on the Rm link 1482 may be set up (established). As used herein, the term "embedded" means that an application utilizing the data connection is running on the user equipment (UE) 1404 and not on an external device such as a laptop connected to the user equipment (UE) 1404. As a result, a simultaneous embedded data call on the Evolution-Data Optimized (EVDO) air interface 106 and a tethered circuit-switched data call or fax on the IS95 air interface may both be supported.

Figure 15:
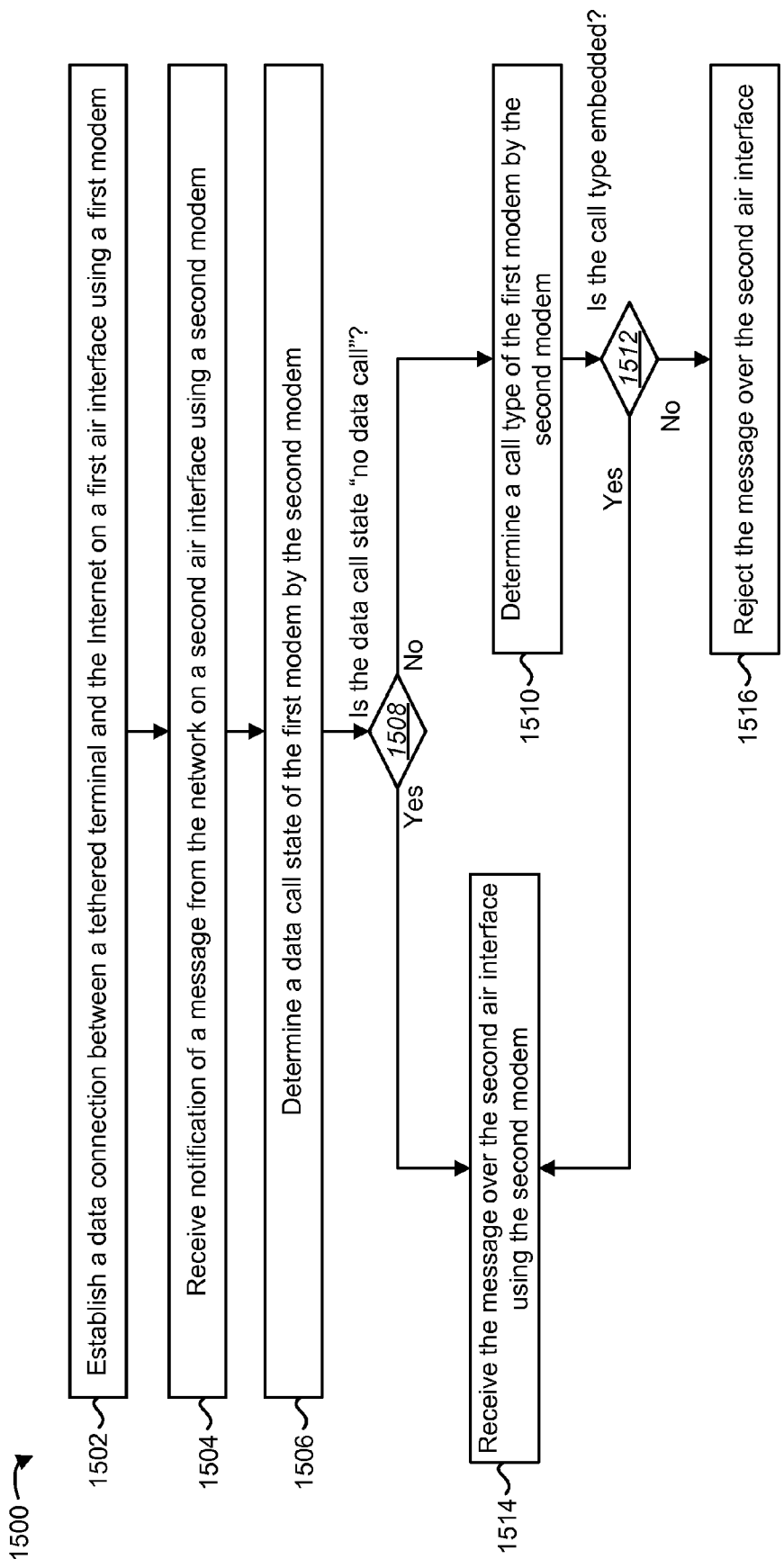
FIG. 15 is a flow diagram of a method for inter-modem communication when a data connection between a tethered terminal and the Internet is established.

FIG. 15 is a flow diagram of a method 1500 for inter-modem communication when a data connection between a tethered terminal 1481 and the Internet 1430 is established. The method 1500 may be performed by a user equipment (UE) 1404. The user equipment (UE) 1404 may include a first modem 1405*a* and a second modem 1405*b*. The first modem 1405*a* and the second modem 1405*b* may each support different air interfaces 106. For example, the first modem 1405*a* may support LTE/EHRPD/EVDO/UMTS/GSM air interfaces 106 while the second modem 1405*b* supports 1x/IS95 air interfaces 106. The user equipment (UE) 1404 may establish 1502 a data connection between a tethered terminal 1481 and the Internet 1430 on a first air interface 106*a* using the first modem 1405*a*. The user equipment (UE) 1404 may then receive 1504 notification of a message from the network on a second air interface 106*b* using the second modem 1405*b*.

The second modem 1405*b* may determine 1506 a data call state 207 of the first modem 1405*a*. As discussed above in relation to FIG. 6 and FIG. 7, the second modem 1405*b* may determine a data call state 207 of the first modem 1405*a* using event-based inter-modem communications or query and response inter-modem communications. The second modem 1405*b* may then determine 1508 whether the data call state 207 of the first modem 1405*a* is "no data call." If the data call state 207 of the first modem 1405*a* is "no data call," the user equipment (UE) 1404 may receive 1514 the message over the second air interface 106*b* using the second modem 1405*b*.

If the data call state 207 of the first modem 1405*a* is not "no data call" (thus the first modem 1405*a* has a data call), the second modem 1405*b* may determine 1510 a call type 210 of the first modem 1405*a*. The second modem 1405*b* may determine 1512 whether the call type 210 of the first modem 1405*a* is embedded. If the call type 210 is not embedded, then the call type may be tethered. If the call type 210 of the first modem 1405*a* is not embedded (and is thus tethered), the user equipment (UE) 1404 may reject 1516 the message over the second air interface 106*b*. If the call type 210 of the first modem 1405*a* is embedded, the user equipment (UE) 1404 may receive 1514 the message over the second air interface 106*b* using the second modem 1405*b*.

Figure 16:
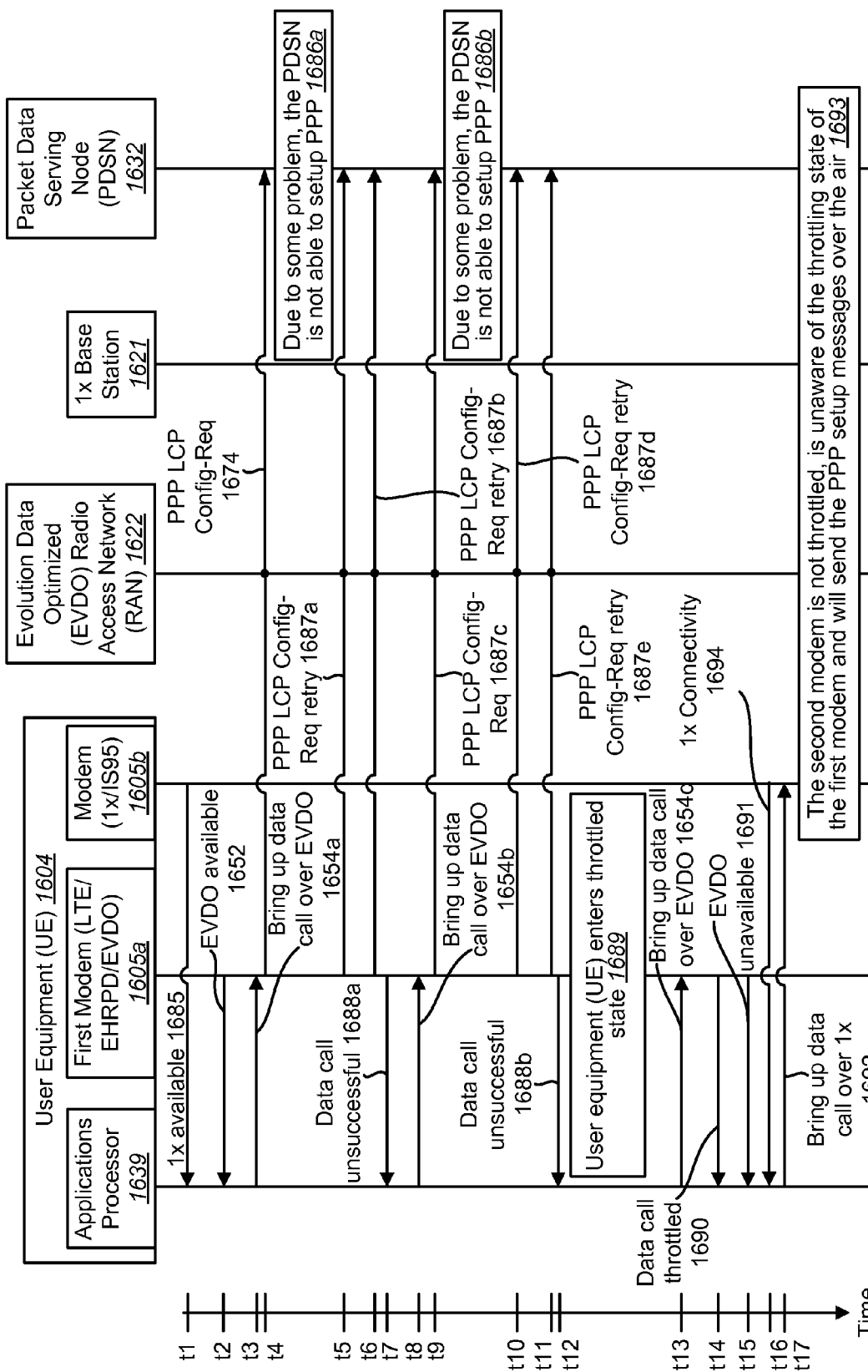
FIG. 16 is a call flow diagram illustrating a scenario for inter-modem communications when call throttling is used.

FIG. 16 is a call flow diagram illustrating a scenario for inter-modem communications when call throttling is used. After a certain number of failed attempts to establish a data call, a modem 1605 attempting the data call may enter a throttled state. The implementation of a throttling state for individual modems 1605 may be done by various known techniques.

A user equipment (UE) 1604 may include an applications processor 1639, a first modem 1605*a* providing LTE/EHRPD/EVDO connectivity and a second modem 1605*b* providing 1x/IS95 connectivity. The network may include an Evolution-Data Optimized (EVDO) radio access network (RAN) 1622, a 1x base station 1621 and a Packet Data Serving Node (PDSN) 1632. The user equipment (UE) 1604 may initially be in a dual coverage area with connectivity available over two air interfaces 106 (e.g., Evolution-Data Optimized (EVDO) and 1×). At time $t_1$, the second modem 1605b may report 1685 1× connectivity to the operating system (OS) on the applications processor 1639. At time $t_2$, the first modem 1605a may report 1652 Evolution-Data Optimized (EVDO) connectivity to the operating system (OS). Note that times $t_1$ and $t_2$ may be substantially the same time. The operating system (OS) may determine that Evolution-Data Optimized (EVDO) is preferred and instruct 1654a the first modem 1605a to establish an Evolution-Data Optimized (EVDO) connection at time $t_3$.

At time $t_4$, the first modem 1605a may send a Point-to-Point Protocol (PPP) Link Control Protocol (LCP) Configuration Request message 1674 to the Packet Data Serving Node (PDSN) 1632. However, the Packet Data Serving Node (PDSN) 1632 may not be able 1686a to setup the Point-to-Point Protocol (PPP). This may be a result of network congestion. At time $t_5$, the first modem 1605a may again attempt to establish a connection by sending a Point-to-Point Protocol (PPP) Link Control Protocol (LCP) Configuration Request retry message 1687a to the Packet Data Serving Node (PDSN) 1632. The Packet Data Serving Node (PDSN) 1632 may still not be able to setup the Point-to-Point Protocol (PPP) connection. At time $t_6$, the first modem 1605a may again send a Point-to-Point Protocol (PPP) Link Control Protocol (LCP) Config-Req retry message 1687b to the Packet Data Serving Node (PDSN) 1632. The Packet Data Serving Node (PDSN) 1632 may still not be able to setup the Point-to-Point Protocol (PPP) connection. At time $t_7$, the first modem 1605a may signal 1688a the applications processor 1639 that the data call could not be established.

At time $t_8$, the applications processor 1639 may again instruct 1654b the first modem 1605a to establish a data call over Evolution-Data Optimized (EVDO). At time $t_9$, the first modem 1605a may send a Point-to-Point Protocol (PPP) Link Control Protocol (LCP) Configuration Request message 1687c to the Packet Data Serving Node (PDSN) 1632. However, the Packet Data Serving Node (PDSN) 1632 may not be able 1686b to setup the Point-to-Point Protocol (PPP). At time $t_{10}$, the first modem 1605a may again attempt to establish a connection by sending a Point-to-Point Protocol (PPP) Link Control Protocol (LCP) Configuration Request retry message 1687d to the Packet Data Serving Node (PDSN) 1632. The Packet Data Serving Node (PDSN) 1632 may still not be able to setup the Point-to-Point Protocol (PPP) connection. At time $t_{11}$, the first modem 1605a may yet again send a Point-to-Point Protocol (PPP) Link Control Protocol (LCP) Config-Req retry message 1687e to the Packet Data Serving Node (PDSN) 1632. The Packet Data Serving Node (PDSN) 1632 may still not be able to setup the Point-to-Point Protocol (PPP) connection.

At time $t_{12}$, the first modem 1605a may signal 1688b the applications processor 1639 that the data call could not be established. At this time, the user equipment (UE) 1604 may enter 1689 a call throttled state. It is to be appreciated that when the call establishment request is refused by the network, the procedures related to throttling with a modem 1605 may take effect. Such procedures may be implemented by various known techniques. While in the call throttled state, the user equipment (UE) 1604 may refrain from sending further data call setup messages to the network for a certain period of time.

At time $t_{13}$, the applications processor 1639 may command 1654c the first modem 1605a to establish a data call over Evolution-Data Optimized (EVDO). At time $t_{14}$, the first modem 1605a may signal 1690 the applications processor 1639 that it is in a call throttled state. At time $t_{15}$, the user equipment (UE) 1604 may enter a 1×-only coverage area 540. The first modem 1605a may report 1691 to the operating system (OS) that Evolution-Data Optimized (EVDO) connectivity has been lost. The second modem 1605b may report 1694 1× connectivity to the operating system (OS) at time $t_{16}$. At time $t_{17}$, the operating system (OS) may instruct 1692 the second modem 1605b to establish a 1× data call. The second modem 1605b may not be in a call throttled state, even though the first modem 1605a is in a call throttled state. The second modem 1605b may attempt 1693 to establish the data call over the 1× air interface even though the user equipment (UE) should be in a call throttled state.

In this scenario, the network operator may deploy the same Packet Data Serving Node (PDSN) 1632 for 1× and Evolution-Data Optimized (EVDO) air interfaces 106. When the user equipment (UE) 1604 is in a call throttled state for Evolution-Data Optimized (EVDO) (perhaps due to IP or Point-to-Point Protocol (PPP) level failures), the user equipment (UE) 1604 generally should not attempt a data call over 1× when entering a 1× coverage area. Each modem 1605 may be able to query the other modem 1605 for additional state information (e.g., state information about the call throttling state of the other modem). This additional information may enable the user equipment (UE) 1604 to remain in a call throttled state when changing coverage areas. This will be illustrated for Evolution-Data Optimized (EVDO) and 1× coverage areas.

Before initiating a data call on 1× (for the second modem 1605b) or Evolution-Data Optimized (EVDO) (for the first modem 1605a), the initiating modem 1605 may query the other modem 1605 for its call throttling state information in addition to the data call state 207 information discussed above. If the information about call throttled state 212 of the other modem 1605 returns "not throttled," the initiation of a data call may proceed immediately. But when the call throttled state 212 of the other modem 1605 is "throttled" and the call throttled state 212 is not due to "radio failures," the initiating modem 1605 may enter a call throttled state 212 (such that the user equipment (UE) 1604 remains in a call throttled state 212) and reject the data call attempt requested by the applications processor 1639. The initiating modem 1605 may retain the same number of data call attempts in the attempts counter 213 and may maintain throttling timers 214 from where the other modem 1605 left off.

While the throttled state solution was described above in the context of a user equipment (UE) 1604 where a 1× air interface 106 is on the second modem 1605b and an Evolution-Data Optimized (EVDO) air interface 106 is available on the first modem 1605a, the solution may be extended to any user equipment (UE) 1604 with two air interface technologies that connect to the same IP core network 229. For example, a user equipment (UE) 1604 where an evolved high rate packet data (EHRPD) air interface 106 is on a first modem 1605a and a Long Term Evolution (LTE) air interface 106 is on the second modem 1605 may be used.

Figure 17:
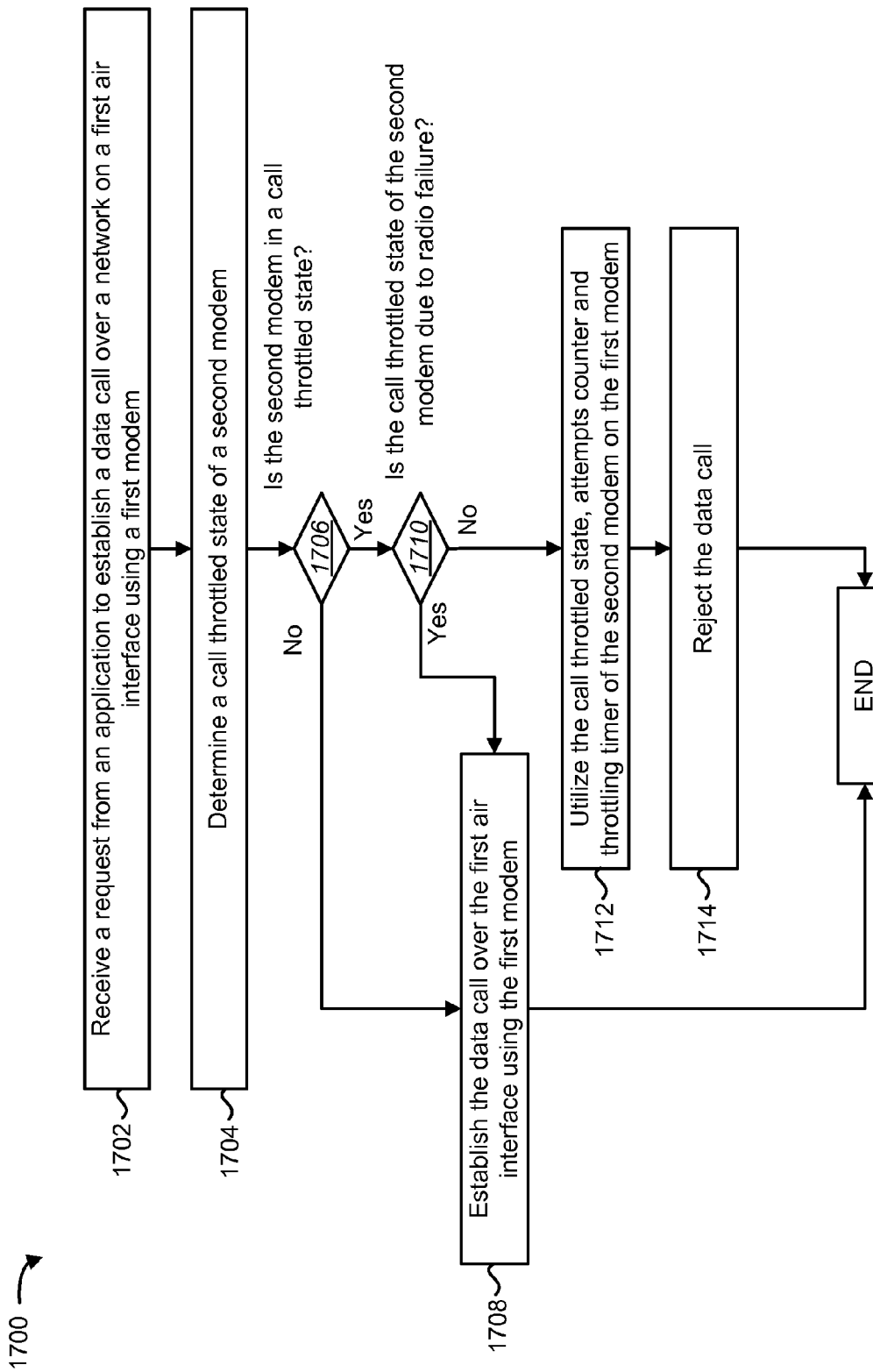
FIG. 17 is a flow diagram of a method for inter-modem communications when call throttling is used.

FIG. 17 is a flow diagram of a method 1700 for inter-modem communications when call throttling is used. The method 1700 may be performed by a user equipment (UE) 104 with a first modem 105a and a second modem 105b. The user equipment (UE) 104 may receive 1702 a request from an application to establish a data call over a network on a first air interface 106a using the first modem 105a. The user equipment (UE) 104 may determine 1704 a call throttled state 212 of the second modem 105b. The user equipment (UE) 104 may determine 1706 whether the second modem 105b is in a call throttled state. If the second modem 105b is not in a call throttled state, the user equipment (UE) 104 may establish 1708 the data call over the first air interface 106a using the first modem 105a.

If the second modem 105b is in a call throttled state, the user equipment (UE) 104 may determine 1710 whether the call throttled state 212 of the second modem 105b is due to radio failure. If the call throttled state 212 of the second modem 105b is due to radio failure, the user equipment (UE) 104 may establish 1708 the data call over the first air interface 106a using the first modem 105a. If the call throttled state 212 of the second modem 105b is not due to radio failure, the user equipment (UE) 104 may utilize 1712 the call throttled state 212, attempts counter 213 and throttling timer 214 of the second modem 105b on the first modem 105a. In other words, the user equipment (UE) 104 may implement the call throttled state 212, attempts counter 213 and throttling timer 214 of the second modem 105b on the first modem 105a. The user equipment (UE) 104 may then reject 1714 the data call (until throttling on the first modem 105a has expired).

Figure 18:
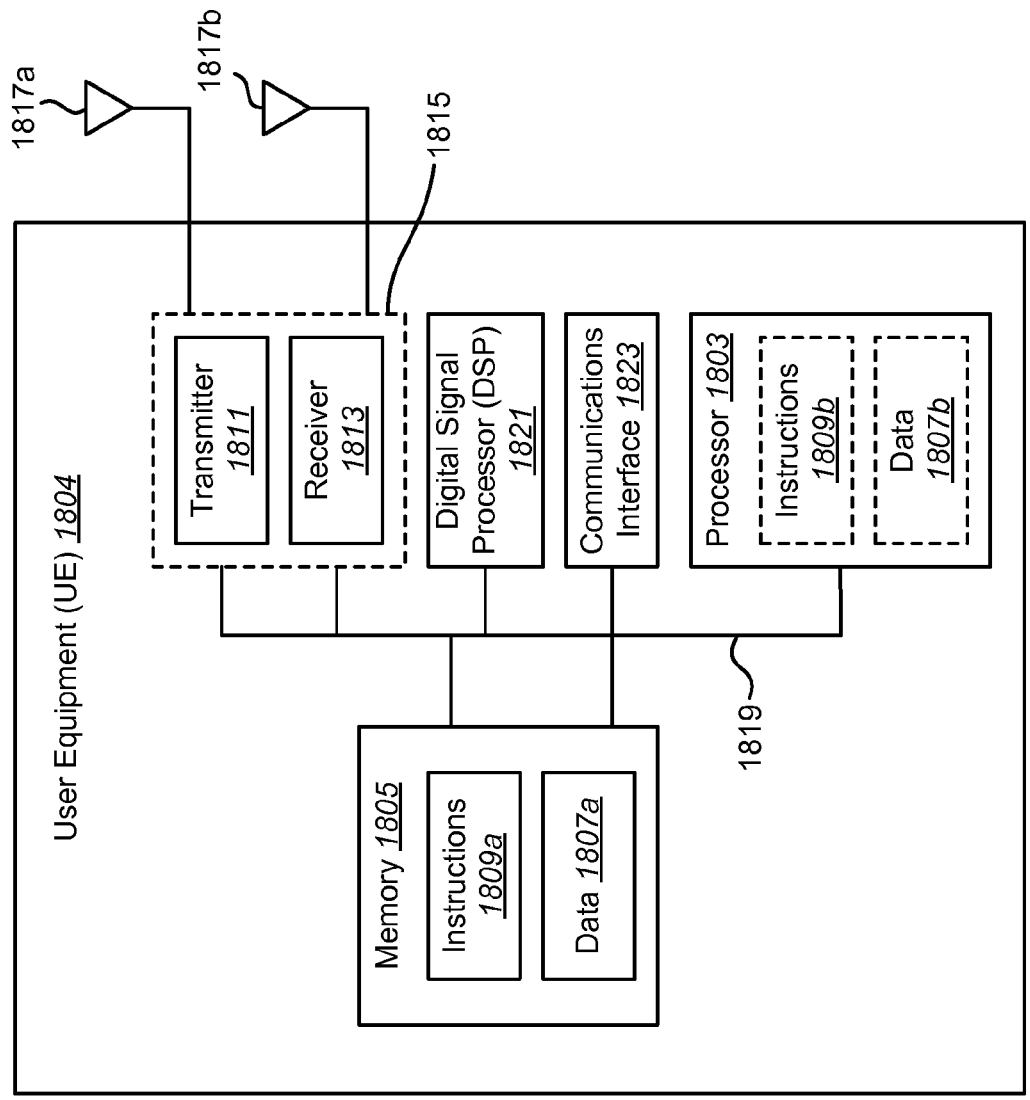
FIG. 18 illustrates certain components that may be included within a wireless communication device.

FIG. 18 illustrates certain components that may be included within a user equipment (UE) 1804. The user equipment (UE) 1804 may be an access terminal, a mobile station, a wireless communication device, etc. The user equipment (UE) 1804 includes a processor 1803. The processor 1803 may be a general purpose single- or multi-chip microprocessor (e.g., an ARM), a special purpose microprocessor (e.g., a digital signal processor (DSP)), a microcontroller, a programmable gate array, etc. The processor 1803 may be referred to as a central processing unit (CPU). Although just a single processor 1803 is shown in the user equipment (UE) 1804 of FIG. 18, in an alternative configuration, a combination of processors (e.g., an ARM and DSP) could be used.

The user equipment (UE) 1804 also includes memory 1805. The memory 1805 may be any electronic component capable of storing electronic information. The memory 1805 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1807a and instructions 1809a may be stored in the memory 1805. The instructions 1809a may be executable by the processor 1803 to implement the methods disclosed herein. Executing the instructions 1809a may involve the use of the data 1807a that is stored in the memory 1805. When the processor 1803 executes the instructions 1809a, various portions of the instructions 1809b may be loaded onto the processor 1803, and various pieces of data 1807b may be loaded onto the processor 1803.

The user equipment (UE) 1804 may also include a transmitter 1811 and a receiver 1813 to allow transmission and reception of signals to and from the user equipment (UE) 1804. The transmitter 1811 and receiver 1813 may be collectively referred to as a transceiver 1815. Multiple antennas 1817a-b may be electrically coupled to the transceiver 1815. The user equipment (UE) 1804 may also include (not shown) multiple transmitters, multiple receivers, multiple transceivers and/or additional antennas.

The user equipment (UE) 1804 may include a digital signal processor (DSP) 1821. The user equipment (UE) 1804 may also include a communications interface 1823. The communications interface 1823 may allow a user to interact with the user equipment (UE) 1804.

The various components of the user equipment (UE) 1804 may be coupled together by one or more buses, which may include a power bus, a control signal bus, a status signal bus, a data bus, etc. For the sake of clarity, the various buses are illustrated in FIG. 18 as a bus system 1819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 10, 12, 15 and 17, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for inter-modem coordination, comprising:
   establishing a first data connection to a network in a first network coverage area using a first air interface provided by a first modem;
   detecting a second network coverage area with a second air interface provided by a second modem;
   upon detecting that the second modem provides a better data service than the established first data connection provided by the first modem, concurrently initiating a first timer by the first modem and a second timer by the second modem for determining a data call state of the second modem and the first modem, respectively;
   terminating the first data connection to the network upon detecting that the first timer and the second timer have not expired and the data call state of the second modem is no data call; and
   initiating a second data connection to the network using the second air interface provided by the second modem upon detecting that the data call state of the first modem is no data call or either one or both of the first and second timers are expired.

2. The method of claim 1, wherein the data call state of the first modem is changed to no data call when the first timer expires.

3. The method of claim 1, wherein the data call state of both the first and second modems comprises no data call, establishing a data call, data call established or data call being torn down.

4. The method of claim 1, further comprising receiving an inter-modem communication from the second modem to signal the data call state of the second modem to the first modem.

5. The method of claim 1, further comprising receiving an inter-modem communication from the first modem to signal the data call state of the first modem to the second modem.

6. The method of claim 1, wherein the method is performed by a user equipment that comprises the first modem and the second modem.

7. A wireless device configured for inter-modem coordination, comprising:
   a processor;
   memory in electronic communication with the processor;
   instructions stored in the memory, the instructions being executable by the processor to:
      establish a first data connection to a network in a first network coverage area using a first air interface provided by a first modem;
      detect a second network coverage area with a second air interface provided by a second modem;
      upon detecting that the second modem provides a better data service than the established first data connection provided by the first modem, concurrently initiate a first timer by the first modem and a second timer by the second modem for determining a data call state of the second modem and the first modem, respectively;
      terminate the first data connection to the network by the first modem upon detecting that the first timer and the second timer have not expired and the data call state of the second modem is no data call; and
      initiate a second data connection to the network using the second air interface provided by the second modem upon detecting that the data call state of the first modem is no data call or either one or both of the first and second timers are expired.

8. The wireless device of claim 7, wherein the data call state of both the first and second modems comprises one of no data call, establishing a data call, data call established and data call being torn down.

9. The wireless device of claim 7, wherein the processor is further configured to receive an inter-modem communication from the second modem to signal the data call state of the second modem to the first modem.

10. The wireless device of claim 7, wherein the processor is further configured to receive an inter-modem communication from the first modem to signal the data call state of the first modem to the second modem.

11. A wireless device configured for inter-modem coordination, comprising:
   means for establishing a first data connection to a network in a first network coverage area using a first air interface provided by a first modem;
   means for detecting a second network coverage area with a second air interface provided by a second modem;
   upon detecting that the second modem provides a better data service than the established first data connection provided by the first modem, means for concurrently initiating a first timer by the first modem and a second timer by the second modem for determining a data call state of the second modem and the first modem, respectively;

means for terminating the first data connection to the network by the first modem upon detecting that the first timer and the second timer have not expired and the data call state of the second modem is no data call; and means for initiating a second data connection to the network using the second air interface provided by the second modem upon detecting that the data call state of the first modem is no data call or either one or both of the first and second timers are expired.

12. A computer-program product for inter-modem coordination, the computer-program product comprising a non-transitory computer-readable medium having instructions thereon, the instructions comprising:

code for causing a wireless device to establish a first data connection to a network in a first network coverage area using a first air interface provided by a first modem;

code for causing the wireless device to detect a second network coverage area with a second air interface provided by a second modem;

code for causing the wireless device to concurrently initiating a first timer by the first modem and a second timer by the second modem for determining a data call state of the second modem and the first modem, respectively, upon detecting that the second modem provides a better data service than the established first data connection provided by the first modem;

code for causing the wireless device to terminate the first data connection to the network by the first modem upon detecting that the first timer and the second timer have not expired and the data call state of the second modem is no data call; and code for causing the wireless device to initiate a second data connection to the network using the second air interface provided by the second modem upon detecting that the data call state of the first modem is no data call or either one or both of the first and second timers are expired.

* * * * *